United States Patent
Gandhi et al.

(10) Patent No.: US 11,323,628 B2
(45) Date of Patent: *May 3, 2022

(54) FIELD OF VIEW ADJUSTMENT

(71) Applicant: GoPro, Inc., San Mateo, CA (US)

(72) Inventors: Ojas Gandhi, Fremont, CA (US); Naveen Chinya Krishnamurthy, Fremont, CA (US)

(73) Assignee: GoPro, Inc., San Mateo, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/113,522

(22) Filed: Dec. 7, 2020

(65) Prior Publication Data

US 2021/0144312 A1 May 13, 2021

Related U.S. Application Data

(63) Continuation of application No. 16/106,607, filed on Aug. 21, 2018, now Pat. No. 10,863,097.

(51) Int. Cl.
*H04N 5/232* (2006.01)
*H04N 5/262* (2006.01)

(52) U.S. Cl.
CPC ... *H04N 5/232935* (2018.08); *H04N 5/23216* (2013.01); *H04N 5/23296* (2013.01); *H04N 5/2628* (2013.01)

(58) Field of Classification Search
CPC ......... H04N 5/232935; H04N 5/23216; H04N 5/23296; H04N 5/2628; H04N 5/2258
See application file for complete search history.

(56) References Cited

U.S. PATENT DOCUMENTS

| | | | | |
|---|---|---|---|---|
| 2007/0253626 | A1* | 11/2007 | Jeffrey | H04N 9/04557 382/232 |
| 2009/0190004 | A1* | 7/2009 | Omori | H04N 5/772 348/240.99 |
| 2009/0273686 | A1* | 11/2009 | Kaikumaa | H04N 5/23293 348/222.1 |
| 2012/0327269 | A1* | 12/2012 | Hwang | H04N 5/23219 348/234 |
| 2013/0141600 | A1* | 6/2013 | Proca | H04N 5/272 348/208.2 |
| 2013/0215291 | A1* | 8/2013 | Baek | H04N 19/426 348/231.99 |
| 2013/0229395 | A1* | 9/2013 | Mills | H04N 5/3675 345/207 |
| 2017/0064227 | A1* | 3/2017 | Lin | G06T 5/005 |
| 2017/0277941 | A1* | 9/2017 | Smith | G06K 9/66 |

(Continued)

*Primary Examiner* — Lin Ye
*Assistant Examiner* — John H Morehead, III
(74) *Attorney, Agent, or Firm* — Young Basile Hanlon & MacFarlane, P.C.

(57) ABSTRACT

Systems and methods are disclosed for field of view adjustment for image capture devices. For example, methods may include receiving a field of view selection; oversampling, using an image sensor, to obtain an image at a capture resolution that is greater than an encode resolution; determining a crop setting based on the field of view selection; cropping the image using the crop setting to obtain a cropped image; down-scaling the cropped image to obtain a scaled image at the encode resolution; encoding the scaled image at the encode resolution; and storing, displaying, or transmitting an output image based on the scaled image.

20 Claims, 10 Drawing Sheets

(56) References Cited

U.S. PATENT DOCUMENTS

2018/0173393 A1\* 6/2018 Verdier .................... G06K 9/22
2018/0336666 A1\* 11/2018 Kim .......................... G06T 7/40
2018/0367752 A1\* 12/2018 Donsbach ............ H04N 19/426

\* cited by examiner

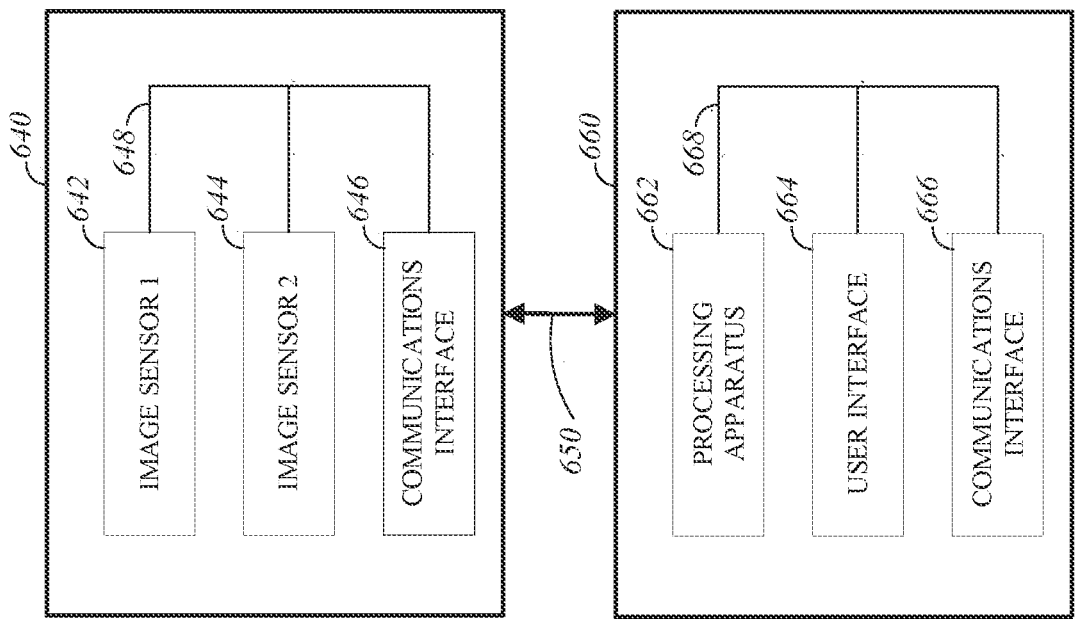
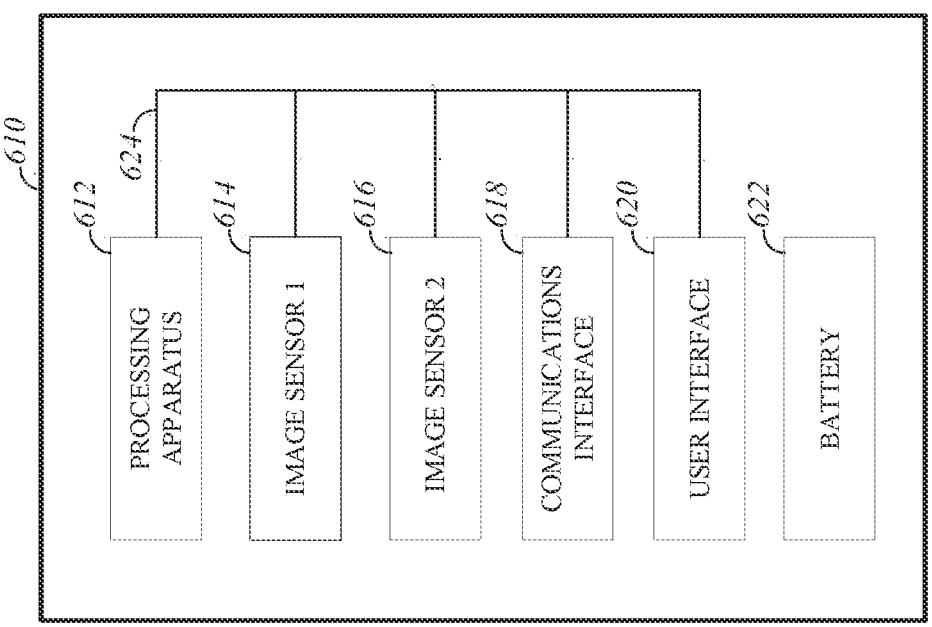
FIG. 6B
FIG. 6A

FIELD OF VIEW ADJUSTMENT

CROSS REFERENCE TO RELATED APPLICATION(S)

This disclosure is a continuation of U.S. application Ser. No. 16/106,607, filed on Aug. 21, 2018, the entire disclosure of which is incorporated by reference herein.

TECHNICAL FIELD

The present disclosure relates to field of view adjustment for image capture devices.

BACKGROUND

Image capture devices, such as cameras, may capture content as images (e.g., still images or frames of video). Light may be received and focused via a lens and may be converted to an electronic image signal by an image sensor. The image signal may be processed by an image signal processor (ISP) to form an image, which may be stored and/or encoded. In some implementations, multiple images or video frames may include spatially adjacent or overlapping content. Accordingly, systems, methods, and apparatus for capturing, processing, and/or encoding images, video, or both may be advantageous.

SUMMARY

The present disclosure describes, inter alia, apparatus and methods for field of view adjustment for image capture devices.

In a first aspect, the subject matter described in this specification can be embodied in systems that include an image sensor configured to capture images, a touchscreen display configured to present a user interface including a slider interface, and a processing apparatus that is configured to: receive a field of view selection via the slider interface; oversample, using the image sensor, to obtain an image at a capture resolution that is greater than an encode resolution; determine a crop setting for a RAW domain crop based on the field of view selection; crop the image in a RAW domain using the crop setting to obtain a cropped image; convert the cropped image from the RAW domain to a YUV domain; down-scale the cropped image in the YUV domain to obtain a scaled image at the encode resolution; encode the scaled image at the encode resolution to obtain an encoded image; and store or transmit the encoded image.

In a second aspect, the subject matter described in this specification can be embodied in methods that include receiving a field of view selection; oversampling, using an image sensor, to obtain an image at a capture resolution that is greater than an encode resolution; determining a crop setting based on the field of view selection; cropping the image using the crop setting to obtain a cropped image; down-scaling the cropped image to obtain a scaled image at the encode resolution; encoding the scaled image at the encode resolution; and storing, displaying, or transmitting an output image based on the scaled image.

In a third aspect, the subject matter described in this specification can be embodied in systems that include an image sensor configured to capture images and a processing apparatus configured to: receive a field of view selection; oversample, using the image sensor, to obtain an image at a capture resolution that is greater than an encode resolution; determine a crop setting based on the field of view selection; crop the image using the crop setting to obtain a cropped image; down-scale the cropped image to obtain a scaled image at the encode resolution; encode the scaled image at the encode resolution to obtain an encoded image; and store or transmit the encoded image.

These and other aspects of the present disclosure are disclosed in the following detailed description, the appended claims, and the accompanying figures.

BRIEF DESCRIPTION OF THE DRAWINGS

The disclosed embodiments have other advantages and features which will be more readily apparent from the detailed description, the appended claims, and the accompanying figures. A brief introduction of the figures is below.

FIG. 6A is a block diagram of an example of a system configured for image capture.

FIG. 6B is a block diagram of an example of a system configured for image capture.

Figure 1:
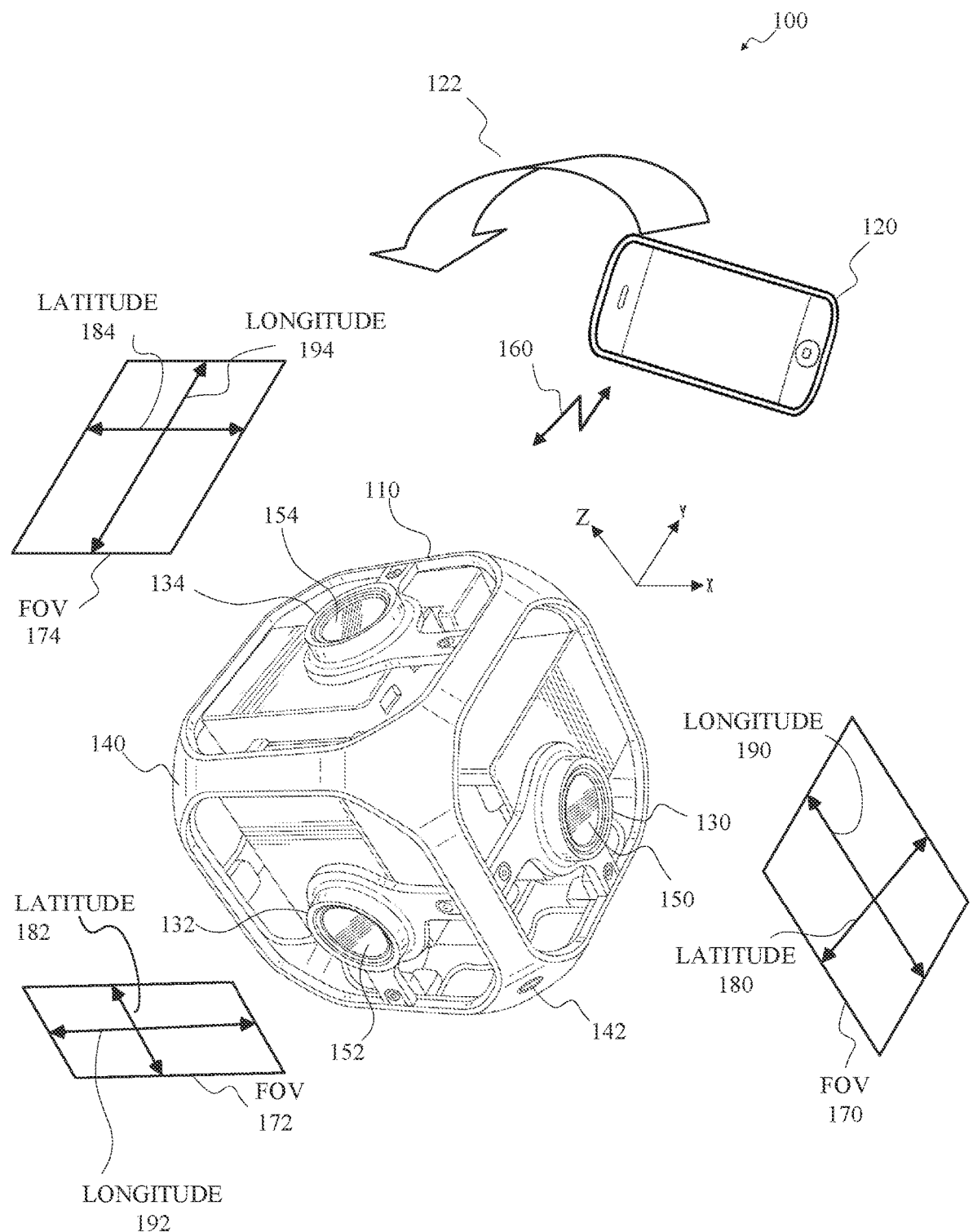
FIG. 1 is a diagram of an example of an image capture system for content capture.

All figures disclosed herein are © Copyright 2020 GoPro Inc. All rights reserved.

DETAILED DESCRIPTION

Content, such as visual content, may be captured as one or more images (e.g., still images or video frames) by one or more image capture devices, such as a camera or camera array. An image capture device may include one or more lenses, image sensors, image signal processors, encoders, or combinations thereof. A lens may receive and focus light on an image sensor or sensors. An image sensor or sensors may sample the light and generate an electronic image signal. An image signal processor (ISP) may receive the image signal from one or more sensors and may process the image signal to generate an image, picture, or frame. The generated images may be stored, such as in a memory of an image capture device, and/or sent to an encoder for encoding, which may include compression. When image is captured by a sensor device, noise is present and it is desirable to suppress this noise.

A smooth field of view adjustment feature is described herein that may allow the user to smoothly change the field of view during capture and still keep the encoded resolution and frame rate constant. This feature may be implemented by cropping an oversampled (e.g., a 4K resolution image), which represents about 118.2 degree horizontal field of view (HFOV) to a desired field of view, and then scaling the cropped image to a target encode/record resolution. The process of scaling the cropped field of view image to the target encode resolution may be critical to image quality in a camera or other image capture device. If the process of scaling cropped resolution to target resolution involves up-scaling, then the resulting image may look soft and pixelated. Smooth field of view adjustment implementations may use oversampled resolution from sensor and avoid up-scaling in a digital image processing pipeline, which may preserve better image quality compare to digital zoom feature available in standard digital cameras/phones. For example, a widest field of view for an image capture device may be ~118 degrees HFOV, a medium field of view may be ~85 degrees HFOV, and a narrow field of view may be ~62 degrees HFOV. For example, this approach may be applied to 1080p video at 120/60/30/24 frames per second and 1440p video with 60/30/24 frames per second modes.

In some implementations, a smooth field of view adjustment (e.g., zoom) feature may be implemented while recording by dynamically programming a RAW crop, a YUV crop and/or a YUV scaler by tuning crop/scale ratio to avoid visible glitches to an end user.

The image quality improvement may be achieved in tandem with low power preview m for image capture device. For example, an image capture device may run low power preview mode most of the time. In low power preview mode, we use a RAW scaler to down-scale so much that for some field of view settings, the images are up-scaled and hence image quality is reduced. Use of these techniques for smooth field of view adjustment may be selectively initiated a user is actively engaging with a device for image capture. For example, a low power preview mode may be run when a user is not using the camera but when the user touches the LCD screen, this event may provide an indication that the user is going to use the camera for framing. For example, in this case an image processing pipeline may be dynamically switched to a configuration described herein that avoids substantial RAW scaling and achieves smooth field of view adjustment/zoom using YUV crop and down-scaling only. In some implementations, gyroscope data from an image capture device may provide an indication when user picks up the camera instead of LCD touch.

Implementations are described in detail with reference to the drawings, which are provided as examples so as to enable those skilled in the art to practice the technology. The figures and examples are not meant to limit the scope of the present disclosure to a single implementation or embodiment, and other implementations and embodiments are possible by way of interchange of, or combination with, some or all of the described or illustrated elements. Wherever convenient, the same reference numbers will be used throughout the drawings to refer to same or like parts.

FIG. 1 is a diagram of an example of an image capture system 100 for content capture in accordance with implementations of this disclosure. As shown in FIG. 1, an image capture system 100 may include an image capture apparatus 110, an external user interface (UI) device 120, or a combination thereof.

In some implementations, the image capture apparatus 110 may be a multi-face apparatus and may include multiple image capture devices, such as image capture devices 130, 132, 134 as shown in FIG. 1, arranged in a structure 140, such as a cube-shaped cage as shown. Although three image capture devices 130, 132, 134 are shown for simplicity in FIG. 1, the image capture apparatus 110 may include any number of image capture devices. For example, the image capture apparatus 110 shown in FIG. 1 may include six cameras, which may include the three image capture devices 130, 132, 134 shown and three cameras not shown.

In some implementations, the structure 140 may have dimensions, such as between 25 mm and 150 mm. For example, the length of each side of the structure 140 may be 105 mm. The structure 140 may include a mounting port 142, which may be removably attachable to a supporting structure, such as a tripod, a photo stick, or any other camera mount (not shown). The structure 140 may be a rigid support structure, such that the relative orientation of the image capture devices 130, 132, 134 of the image capture apparatus 110 may be maintained in relatively static or fixed alignment, except as described herein.

The image capture apparatus 110 may obtain, or capture, image content, such as images, video, or both, with a 360° field-of-view, which may be referred to herein as panoramic or spherical content. For example, each of the image capture devices 130, 132, 134 may include respective lenses, for receiving and focusing light, and respective image sensors for converting the received and focused light to an image signal, such as by measuring or sampling the light, and the multiple image capture devices 130, 132, 134 may be arranged such that respective image sensors and lenses capture a combined field-of-view characterized by a spherical or near spherical field-of-view.

In some implementations, each of the image capture devices 130, 132, 134 may have a respective field-of-view 170, 172, 174, such as a field-of-view 170, 172, 174 that 90° in a latitudinal dimension 180, 182, 184 and includes 120° in a longitudinal dimension 190, 192, 194. In some implementations, image capture devices 130, 132, 134 having overlapping fields-of-view 170, 172, 174, or the image sensors thereof, may be oriented at defined angles, such as at 90°, with respect to one another. In some implementations, the image sensor of the image capture device 130 is directed along the X axis, the image sensor of the image capture device 132 is directed along the Y axis, and the image sensor of the image capture device 134 is directed along the Z axis. The respective fields-of-view 170, 172, 174 for adjacent image capture devices 130, 132, 134 may be oriented to allow overlap for a stitching function. For example, the longitudinal dimension 190 of the field-of-view 170 for the image capture device 130 may be oriented at 90° with respect to the latitudinal dimension 184 of the field-of-view 174 for the image capture device 134, the latitudinal dimension 180 of the field-of-view 170 for the image capture device 130 may be oriented at 90° with respect to the longitudinal dimension 192 of the field-of-view 172 for the image capture device 132, and the latitudinal dimension 182 of the field-of-view 172 for the image capture device 132 may be oriented at 90° with respect to the longitudinal dimension 194 of the field-of-view 174 for the image capture device 134.

The image capture apparatus 110 shown in FIG. 1 may have 420° angular coverage in vertical and/or horizontal planes by the successive overlap of 90°, 120°, 90°, 120° respective fields-of-view 170, 172, 174 (not all shown) for four adjacent image capture devices 130, 132, 134 (not all shown). For example, fields-of-view 170, 172 for the image capture devices 130, 132 and fields-of-view (not shown) for two image capture devices (not shown) opposite the image capture devices 130, 132 respectively may be combined to provide 420° angular coverage in a horizontal plane. In some implementations, the overlap between fields-of-view of image capture devices 130, 132, 134 having a combined field-of-view including less than 360° angular coverage in a vertical and/or horizontal plane may be aligned and merged or combined to produce a panoramic image. For example, the image capture apparatus 110 may be in motion, such as rotating, and source images captured by at least one of the image capture devices 130, 132, 134 may be combined to form a panoramic image. As another example, the image capture apparatus 110 may be stationary, and source images captured contemporaneously by each image capture device 130, 132, 134 may be combined to form a panoramic image.

In some implementations, an image capture device 130, 132, 134 may include a lens 150, 152, 154 or other optical element. An optical element may include one or more lens, macro lens, zoom lens, special-purpose lens, telephoto lens, prime lens, achromatic lens, apochromatic lens, process lens, wide-angle lens, ultra-wide-angle lens, fisheye lens, infrared lens, ultraviolet lens, perspective control lens, other lens, and/or other optical element. In some implementations, a lens 150, 152, 154 may be a fisheye lens and produce fisheye, or near-fisheye, field-of-view images. For example, the respective lenses 150, 152, 154 of the image capture devices 130, 132, 134 may be fisheye lenses. In some implementations, images captured by two or more image capture devices 130, 132, 134 of the image capture apparatus 110 may be combined by stitching or merging fisheye projections of the captured images to produce an equirectangular planar image. For example, a first fisheye image may be a round or elliptical image, and may be transformed to a first rectangular image, a second fisheye image may be a round or elliptical image, and may be transformed to a second rectangular image, and the first and second rectangular images may be arranged side-by-side, which may include overlapping, and stitched together to form the equirectangular planar image.

Although not expressly shown in FIG. 1, In some implementations, an image capture device 130, 132, 134 may include one or more image sensors, such as a charge-coupled device (CCD) sensor, an active pixel sensor (APS), a complementary metal-oxide semiconductor (CMOS) sensor, an N-type metal-oxide-semiconductor (NMOS) sensor, and/or any other image sensor or combination of image sensors.

Although not expressly shown in FIG. 1, in some implementations, an image capture apparatus 110 may include one or more microphones, which may receive, capture, and record audio information, which may be associated with images acquired by the image sensors.

Although not expressly shown in FIG. 1, the image capture apparatus 110 may include one or more other information sources or sensors, such as an inertial measurement unit (IMU), a global positioning system (GPS) receiver component, a pressure sensor, a temperature sensor, a heart rate sensor, or any other unit, or combination of units, that may be included in an image capture apparatus.

In some implementations, the image capture apparatus 110 may interface with or communicate with an external device, such as the external user interface (UI) device 120, via a wired (not shown) or wireless (as shown) computing communication link 160. Although a single computing communication link 160 is shown in FIG. 1 for simplicity, any number of computing communication links may be used. Although the computing communication link 160 shown in FIG. 1 is shown as a direct computing communication link, an indirect computing communication link, such as a link including another device or a network, such as the internet, may be used. In some implementations, the computing communication link 160 may be a Wi-Fi link, an infrared link, a Bluetooth (BT) link, a cellular link, a ZigBee link, a near field communications (NFC) link, such as an ISO/IEC 23243 protocol link, an Advanced Network Technology interoperability (ANT+) link, and/or any other wireless communications link or combination of links. In some implementations, the computing communication link 160 may be an HDMI link, a USB link, a digital video interface link, a display port interface link, such as a Video Electronics Standards Association (VESA) digital display interface link, an Ethernet link, a Thunderbolt link, and/or other wired computing communication link.

In some implementations, the user interface device 120 may be a computing device, such as a smartphone, a tablet computer, a phablet, a smart watch, a portable computer, and/or another device or combination of devices configured to receive user input, communicate information with the image capture apparatus 110 via the computing communication link 160, or receive user input and communicate information with the image capture apparatus 110 via the computing communication link 160.

In some implementations, the image capture apparatus 110 may transmit images, such as panoramic images, or portions thereof, to the user interface device 120 via the computing communication link 160, and the user interface device 120 may store, process, display, or a combination thereof the panoramic images.

In some implementations, the user interface device 120 may display, or otherwise present, content, such as images or video, acquired by the image capture apparatus 110. For example, a display of the user interface device 120 may be a viewport into the three-dimensional space represented by the panoramic images or video captured or created by the image capture apparatus 110.

In some implementations, the user interface device 120 may communicate information, such as metadata, to the image capture apparatus 110. For example, the user interface device 120 may send orientation information of the user interface device 120 with respect to a defined coordinate system to the image capture apparatus 110, such that the image capture apparatus 110 may determine an orientation of the user interface device 120 relative to the image capture apparatus 110. Based on the determined orientation, the image capture apparatus 110 may identify a portion of the panoramic images or video captured by the image capture apparatus 110 for the image capture apparatus 110 to send to the user interface device 120 for presentation as the viewport. In some implementations, based on the determined orientation, the image capture apparatus 110 may determine the location of the user interface device 120 and/or the dimensions for viewing of a portion of the panoramic images or video.

In an example, a user may rotate (sweep) the user interface device 120 through an arc or path 122 in space, as indicated by the arrow shown at 122 in FIG. 1. The user interface device 120 may communicate display orientation information to the image capture apparatus 110 using a communication interface such as the computing communication link 160. The image capture apparatus 110 may provide an encoded bitstream to enable viewing of a portion of the panoramic content corresponding to a portion of the environment of the display location as the image capture apparatus 110 traverses the path 122. Accordingly, display orientation information from the user interface device 120 may be transmitted to the image capture apparatus 110 to control user selectable viewing of captured images and/or video.

In some implementations, the image capture apparatus 110 may communicate with one or more other external devices (not shown) via wired or wireless computing communication links (not shown).

In some implementations, data, such as image data, audio data, and/or other data, obtained by the image capture apparatus 110 may be incorporated into a combined multimedia stream. For example, the multimedia stream may include a video track and/or an audio track. As another example, information from various metadata sensors and/or sources within and/or coupled to the image capture apparatus 110 may be processed to produce a metadata track associated with the video and/or audio track. The metadata track may include metadata, such as white balance metadata, image sensor gain metadata, sensor temperature metadata, exposure time metadata, lens aperture metadata, bracketing configuration metadata and/or other parameters. In some implementations, a multiplexed stream may be generated to incorporate a video and/or audio track and one or more metadata tracks.

In some implementations, the user interface device 120 may implement or execute one or more applications, such as GoPro Studio, GoPro App, or both, to manage or control the image capture apparatus 110. For example, the user interface device 120 may include an application for controlling camera configuration, video acquisition, video display, or any other configurable or controllable aspect of the image capture apparatus 110.

In some implementations, the user interface device 120, such as via an application (e.g., GoPro App), may generate and share, such as via a cloud-based or social media service, one or more images, or short video clips, such as in response to user input.

In some implementations, the user interface device 120, such as via an application (e.g., GoPro App), may remotely control the image capture apparatus 110, such as in response to user input.

In some implementations, the user interface device 120, such as via an application (e.g., GoPro App), may display unprocessed or minimally processed images or video captured by the image capture apparatus 110 contemporaneously with capturing the images or video by the image capture apparatus 110, such as for shot framing, which may be referred to herein as a live preview, and which may be performed in response to user input.

In some implementations, the user interface device 120, such as via an application (e.g., GoPro App), may mark one or more key moments contemporaneously with capturing the images or video by the image capture apparatus 110, such as with a HiLight Tag, such as in response to user input.

In some implementations, the user interface device 120, such as via an application (e.g., GoPro App), may display, or otherwise present, marks or tags associated with images or video, such as HiLight Tags, such as in response to user input. For example, marks may be presented in a GoPro Camera Roll application for location review and/or playback of video highlights.

In some implementations, the user interface device 120, such as via an application (e.g., GoPro App), may wirelessly control camera software, hardware, or both. For example, the user interface device 120 may include a web-based graphical interface accessible by a user for selecting a live or previously recorded video stream from the image capture apparatus 110 for display on the user interface device 120.

In some implementations, the user interface device 120 may receive information indicating a user setting, such as an image resolution setting (e.g., 3840 pixels by 2160 pixels), a frame rate setting (e.g., 60 frames per second (fps)), a location setting, and/or a context setting, which may indicate an activity, such as mountain biking, in response to user input, and may communicate the settings, or related information, to the image capture apparatus 110.

Figure 2:
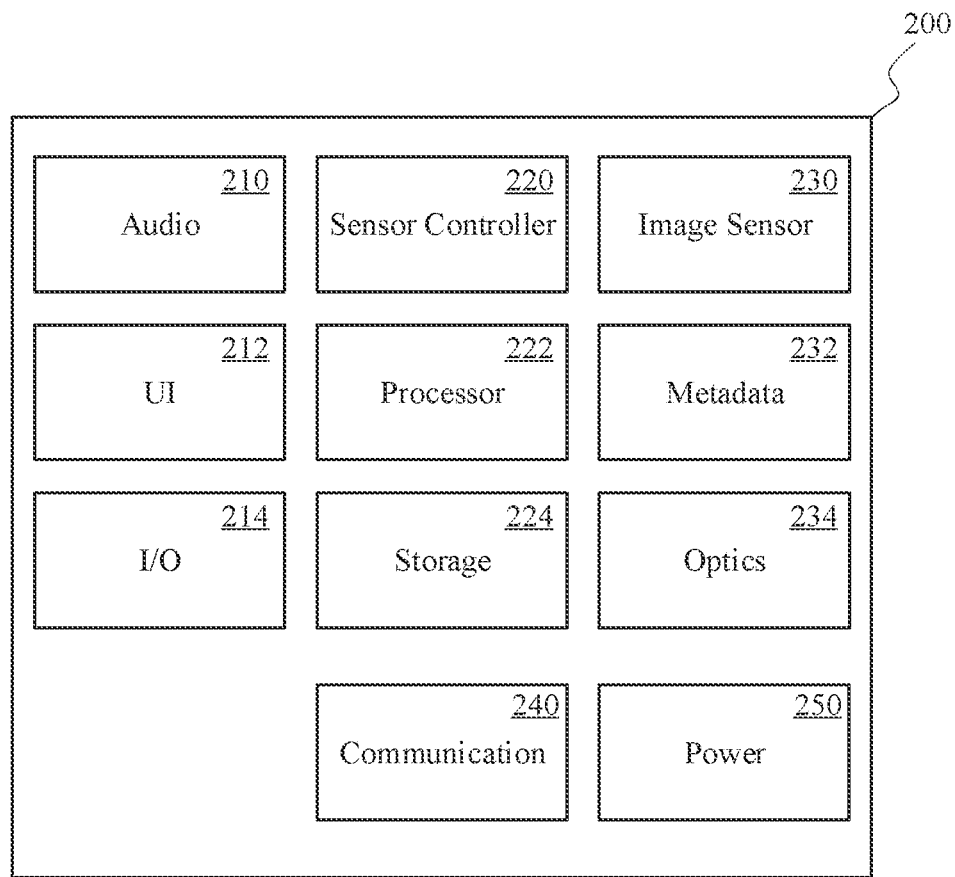
FIG. 2 is a block diagram of an example of an image capture device.

FIG. 2 is a block diagram of an example of an image capture device 200 in accordance with implementations of this disclosure. In some implementations, an image capture device 200, such as one of the image capture devices 130, 132, 134 shown in FIG. 1, which may be an action camera, may include an audio component 210, a user interface (UI) unit 212, an input/output (I/O) unit 214, a sensor controller 220, a processor 222, an electronic storage unit 224, an image sensor 230, a metadata unit 232, an optics unit 234, a communication unit 240, a power system 250, or a combination thereof.

In some implementations, the audio component 210, which may include a microphone, may receive, sample, capture, record, or a combination thereof audio information, such as sound waves, which may be associated with, such as stored in association with, image or video content contemporaneously captured by the image capture device 200. In some implementations, audio information may be encoded using, e.g., Advanced Audio Coding (AAC), Audio Compression—3 (AC3), Moving Picture Experts Group Layer-3 Audio (MP3), linear Pulse Code Modulation (PCM), Motion Picture Experts Group—High efficiency coding and media delivery in heterogeneous environments (MPEG-H), and/or other audio coding formats (audio codecs). In one or more implementations of spherical video and/or audio, the audio codec may include a three-dimensional audio codec, such as Ambisonics. For example, an Ambisonics codec can produce full surround audio including a height dimension. Using a G-format Ambisonics codec, a special decoder may be omitted.

In some implementations, the user interface unit 212 may include one or more units that may register or receive input from and/or present outputs to a user, such as a display, a touch interface, a proximity sensitive interface, a light receiving/emitting unit, a sound receiving/emitting unit, a wired/wireless unit, and/or other units. In some implementations, the user interface unit 212 may include a display, one or more tactile elements (e.g., buttons and/or virtual touch screen buttons), lights (LEDs), speakers, and/or other user interface elements. The user interface unit 212 may receive user input and/or provide information to a user related to the operation of the image capture device 200.

In some implementations, the user interface unit 212 may include a display unit that presents information related to camera control or use, such as operation mode information (e.g., image resolution, frame rate, capture mode, sensor mode, video mode, photo mode), connection status information (e.g., connected, wireless, wired connection), power mode information (e.g., standby mode, sensor mode, video mode), information related to other information sources (e.g., heart rate, GPS), and/or other information.

In some implementations, the user interface unit 212 may include a user interface component such as one or more buttons, which may be operated, such as by a user, to control camera operations, such as to start, stop, pause, and/or resume sensor and/or content capture. The camera control associated with respective user interface operations may be defined. For example, the camera control associated with respective user interface operations may be defined based on the duration of a button press (pulse width modulation), a number of button presses (pulse code modulation), or a combination thereof. In an example, a sensor acquisition mode may be initiated in response to detecting two short button presses. In another example, the initiation of a video mode and cessation of a photo mode, or the initiation of a photo mode and cessation of a video mode, may be triggered (toggled) in response to a single short button press. In another example, video or photo capture for a given time duration or a number of frames (burst capture) may be triggered in response to a single short button press. Other user command or communication implementations may also be implemented, such as one or more short or long button presses.

In some implementations, the I/O unit 214 may synchronize the image capture device 200 with other cameras and/or with other external devices, such as a remote control, a second image capture device, a smartphone, a user interface device, such as the user interface device 120 shown in FIG. 1, and/or a video server. The I/O unit 214 may communicate information between I/O components. In some implementations, the I/O unit 214 may be connected to the communication unit 240 to provide a wired and/or wireless communications interface (e.g., Wi-Fi, Bluetooth, USB, HDMI, Wireless USB, Near Field Communication (NFC), Ethernet, a radio frequency transceiver, and/or other interfaces) for communication with one or more external devices, such as a user interface device, such as the user interface device 120 shown in FIG. 1, or another metadata source. In some implementations, the I/O unit 214 may interface with LED lights, a display, a button, a microphone, speakers, and/or other I/O components. In some implementations, the I/O unit 214 may interface with an energy source, e.g., a battery, and/or a Direct Current (DC) electrical source.

In some implementations, the I/O unit 214 of the image capture device 200 may include one or more connections to external computerized devices for configuration and/or management of remote devices, as described herein. The I/O unit 214 may include any of the wireless or wireline interfaces described herein, and/or may include customized or proprietary connections for specific applications.

In some implementations, the sensor controller 220 may operate or control the image sensor 230, such as in response to input, such as user input. In some implementations, the sensor controller 220 may receive image and/or video input from the image sensor 230 and may receive audio information from the audio component 210.

In some implementations, the processor 222 may include a system on a chip (SOC), microcontroller, microprocessor, CPU, DSP, application-specific integrated circuit (ASIC), GPU, and/or other processor that may control the operation and functionality of the image capture device 200. In some implementations, the processor 222 may interface with the sensor controller 220 to obtain and process sensory information for, e.g., object detection, face tracking, stereo vision, and/or other image processing.

In some implementations, the sensor controller 220, the processor 222, or both may synchronize information received by the image capture device 200. For example, timing information may be associated with received sensor data, and metadata information may be related to content (photo/video) captured by the image sensor 230 based on the timing information. In some implementations, the metadata capture may be decoupled from video/image capture. For example, metadata may be stored before, after, and in-between the capture, processing, or storage of one or more video clips and/or images.

In some implementations, the sensor controller 220, the processor 222, or both may evaluate or process received metadata and may generate other metadata information. For example, the sensor controller 220 may integrate the received acceleration information to determine a velocity profile for the image capture device 200 concurrent with recording a video. In some implementations, video information may include multiple frames of pixels and may be encoded using an encoding method (e.g., H.265, H.264, CineForm, and/or other codec).

Although not shown separately in FIG. 2, one or more of the audio component 210, the user interface unit 212, the I/O unit 214, the sensor controller 220, the processor 222, the electronic storage unit 224, the image sensor 230, the metadata unit 232, the optics unit 234, the communication unit 240, or the power systems 250 of the image capture device 200 may communicate information, power, or both with one or more other units, such as via an electronic communication pathway, such as a system bus. For example, the processor 222 may interface with the audio component 210, the user interface unit 212, the I/O unit 214, the sensor controller 220, the electronic storage unit 224, the image sensor 230, the metadata unit 232, the optics unit 234, the communication unit 240, or the power systems 250 via one or more driver interfaces and/or software abstraction layers. In some implementations, one or more of the units shown in FIG. 2 may include a dedicated processing unit, memory unit, or both (not shown). In some implementations, one or more components may be operable by one or more other control processes. For example, a GPS receiver may include a processing apparatus that may provide position and/or motion information to the processor 222 in accordance with a defined schedule (e.g., values of latitude, longitude, and elevation at 10 Hz).

In some implementations, the electronic storage unit 224 may include a system memory module that may store executable computer instructions that, when executed by the processor 222, perform various functionalities including those described herein. For example, the electronic storage unit 224 may be a non-transitory computer-readable storage medium, which may include executable instructions, and a processor, such as the processor 222 may execute the instruction to perform one or more, or portions of one or more, of the operations described herein. The electronic storage unit 224 may include storage memory for storing content (e.g., metadata, images, audio) captured by the image capture device 200.

In some implementations, the electronic storage unit 224 may include non-transitory memory for storing configuration information and/or processing code for video information and metadata capture, and/or to produce a multimedia stream that may include video information and metadata in accordance with the present disclosure. In some implementations, the configuration information may include capture type (video, still images), image resolution, frame rate, burst setting, white balance, recording configuration (e.g., loop mode), audio track configuration, and/or other parameters that may be associated with audio, video, and/or metadata capture. In some implementations, the electronic storage unit 224 may include memory that may be used by other hardware/firmware/software elements of the image capture device 200.

In some implementations, the image sensor 230 may include one or more of a charge-coupled device sensor, an active pixel sensor, a complementary metal-oxide semiconductor sensor, an N-type metal-oxide-semiconductor sensor, and/or another image sensor or combination of image sensors. In some implementations, the image sensor 230 may be controlled based on control signals from a sensor controller 220.

The image sensor 230 may sense or sample light waves gathered by the optics unit 234 and may produce image data or signals. The image sensor 230 may generate an output signal conveying visual information regarding the objects or other content corresponding to the light waves received by the optics unit 234. The visual information may include one or more of an image, a video, and/or other visual information.

In some implementations, the image sensor 230 may include a video sensor, an acoustic sensor, a capacitive sensor, a radio sensor, a vibrational sensor, an ultrasonic sensor, an infrared sensor, a radar sensor, a Light Detection And Ranging (LIDAR) sensor, a sonar sensor, or any other sensory unit or combination of sensory units capable of detecting or determining information in a computing environment.

In some implementations, the metadata unit 232 may include sensors such as an IMU, which may include one or more accelerometers and/or gyroscopes, a magnetometer, a compass, a GPS sensor, an altimeter, an ambient light sensor, a temperature sensor, and/or other sensors or combinations of sensors. In some implementations, the image capture device 200 may contain one or more other metadata/telemetry sources, e.g., image sensor parameters, battery monitor, storage parameters, and/or other information related to camera operation and/or capture of content. The metadata unit 232 may obtain information related to the environment of the image capture device 200 and aspects in which the content is captured.

For example, the metadata unit 232 may include an accelerometer that may provide device motion information including velocity and/or acceleration vectors representative of motion of the image capture device 200. In another example, the metadata unit 232 may include a gyroscope that may provide orientation information describing the orientation of the image capture device 200. In another example, the metadata unit 232 may include a GPS sensor that may provide GPS coordinates, time, and information identifying a location of the image capture device 200. In another example, the metadata unit 232 may include an altimeter that may obtain information indicating an altitude of the image capture device 200.

In some implementations, the metadata unit 232, or one or more portions thereof, may be rigidly coupled to the image capture device 200 such that motion, changes in orientation, or changes in the location of the image capture device 200 may be accurately detected by the metadata unit 232. Although shown as a single unit, the metadata unit 232, or one or more portions thereof, may be implemented as multiple distinct units. For example, the metadata unit 232 may include a temperature sensor as a first physical unit and a GPS unit as a second physical unit. In some implementations, the metadata unit 232, or one or more portions thereof, may be included in an image capture device 200 as shown, or may be included in a physically separate unit operatively coupled to, such as in communication with, the image capture device 200.

In some implementations, the optics unit 234 may include one or more of a lens, macro lens, zoom lens, special-purpose lens, telephoto lens, prime lens, achromatic lens, apochromatic lens, process lens, wide-angle lens, ultra-wide-angle lens, fisheye lens, infrared lens, ultraviolet lens, perspective control lens, other lens, and/or other optics component. In some implementations, the optics unit 234 may include a focus controller unit that may control the operation and configuration of the camera lens. The optics unit 234 may receive light from an object and may focus received light onto an image sensor 230. Although not shown separately in FIG. 2, in some implementations, the optics unit 234 and the image sensor 230 may be combined, such as in a combined physical unit, such as a housing.

In some implementations, the communication unit 240 may be coupled to the I/O unit 214 and may include a component (e.g., a dongle) having an infrared sensor, a radio frequency transceiver and antenna, an ultrasonic transducer, and/or other communications interfaces used to send and receive wireless communication signals. In some implementations, the communication unit 240 may include a local (e.g., Bluetooth, Wi-Fi) and/or broad range (e.g., cellular LTE) communications interface for communication between the image capture device 200 and a remote device (e.g., the user interface device 120 in FIG. 1). The communication unit 240 may communicate using, for example, Ethernet, 802.11, worldwide interoperability for microwave access (WiMAX), 3G, Long Term Evolution (LTE), digital subscriber line (DSL), asynchronous transfer mode (ATM), InfiniBand, PCI Express Advanced Switching, and/or other communication technologies. In some implementations, the communication unit 240 may communicate using networking protocols, such as multiprotocol label switching (MPLS), transmission control protocol/Internet protocol (TCP/IP), User Datagram Protocol (UDP), hypertext transport protocol (HTTP), simple mail transfer protocol (SMTP), file transfer protocol (FTP), and/or other networking protocols.

Information exchanged via the communication unit 240 may be represented using formats including one or more of hypertext markup language (HTML), extensible markup language (XML), and/or other formats. One or more exchanges of information between the image capture device 200 and remote or external devices may be encrypted using encryption technologies including one or more of secure sockets layer (SSL), transport layer security (TLS), virtual private networks (VPNs), Internet Protocol security (IPsec), and/or other encryption technologies.

In some implementations, the one or more power systems 250 supply power to the image capture device 200. For example, for a small-sized, lower-power action camera a wireless power solution (e.g., battery, solar cell, inductive (contactless) power source, rectification, and/or other power supply) may be used.

Consistent with the present disclosure, the components of the image capture device 200 may be remote from one another and/or aggregated. For example, one or more sensor components may be distal from the image capture device 200, e.g., such as shown and described with respect to FIG. 1. Multiple mechanical, sensory, or electrical units may be controlled by a learning apparatus via network/radio connectivity.

Figure 3:
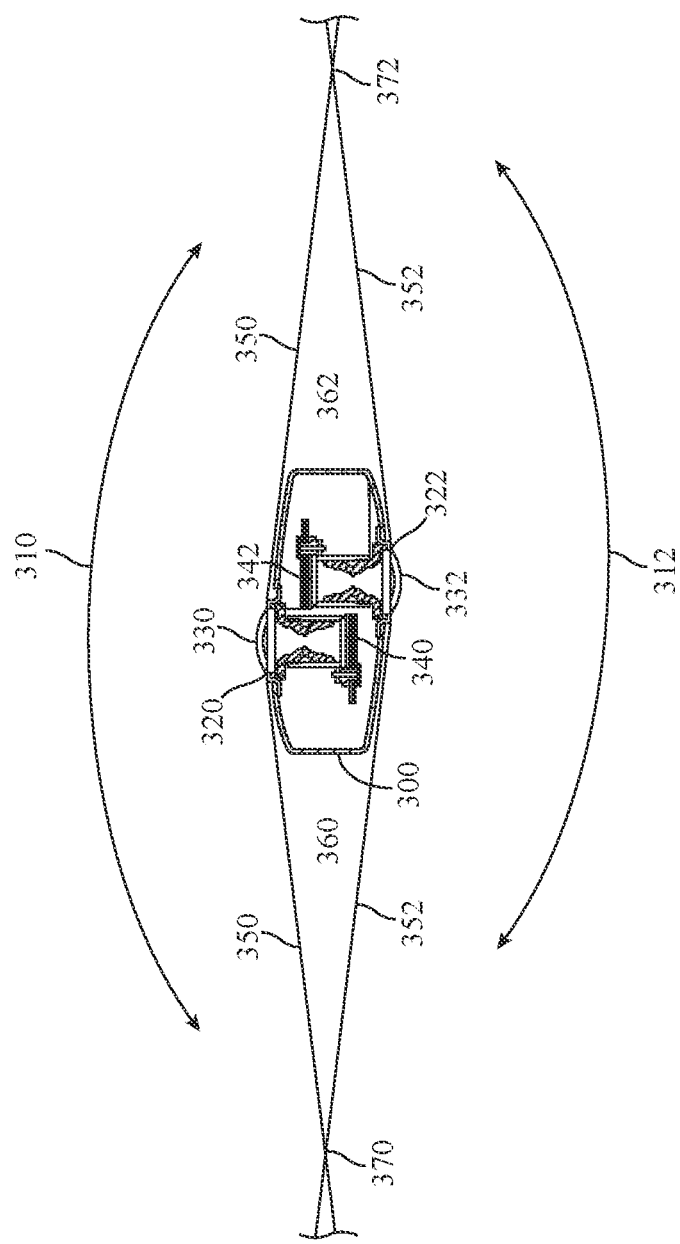
FIG. 3 is a cross-sectional view of an example of an image capture apparatus including overlapping fields-of-view.

FIG. 3 is a cross-sectional view of an example of a dual-lens image capture apparatus 300 including overlapping fields-of-view 310, 312 in accordance with implementations of this disclosure. In some implementations, the image capture apparatus 300 may be a spherical image capture apparatus with fields-of-view 310, 312 as shown in FIG. 3. For example, the image capture apparatus 300 may include image capture devices 320, 322, related components, or a combination thereof, arranged in a back-to-back or Janus configuration. For example, a first image capture device 320 may include a first lens 330 and a first image sensor 340, and a second image capture device 322 may include a second lens 332 and a second image sensor 342 arranged oppositely from the first lens 330 and the first image sensor 340.

The first lens 330 of the image capture apparatus 300 may have the field-of-view 310 shown above a boundary 350.

Behind the first lens 330, the first image sensor 340 may capture a first hyper-hemispherical image plane from light entering the first lens 330, corresponding to the first field-of-view 310.

The second lens 332 of the image capture apparatus 300 may have a field-of-view 312 as shown below a boundary 352. Behind the second lens 332, the second image sensor 342 may capture a second hyper-hemispherical image plane from light entering the second lens 332, corresponding to the second field-of-view 312.

In some implementations, one or more areas, such as blind spots 360, 362, may be outside of the fields-of-view 310, 312 of the lenses 330, 332, light may be obscured from the lenses 330, 332 and the respective image sensors 340, 342, and content in the blind spots 360, 362 may be omitted from capture. In some implementations, the image capture apparatus 300 may be configured to minimize the blind spots 360, 362.

In some implementations, the fields-of-view 310, 312 may overlap. Stitch points 370, 372, proximal to the image capture apparatus 300, at which the fields-of-view 310, 312 overlap may be referred to herein as overlap points or stitch points. Content captured by the respective lenses 330, 332, distal to the stitch points 370, 372, may overlap.

In some implementations, images contemporaneously captured by the respective image sensors 340, 342 may be combined to form a combined image. Combining the respective images may include correlating the overlapping regions captured by the respective image sensors 340, 342, aligning the captured fields-of-view 310, 312, and stitching the images together to form a cohesive combined image.

In some implementations, a small change in the alignment (e.g., position and/or tilt) of the lenses 330, 332, the image sensors 340, 342, or both may change the relative positions of their respective fields-of-view 310, 312 and the locations of the stitch points 370, 372. A change in alignment may affect the size of the blind spots 360, 362, which may include changing the size of the blind spots 360, 362 unequally.

In some implementations, incomplete or inaccurate information indicating the alignment of the image capture devices 320, 322, such as the locations of the stitch points 370, 372, may decrease the accuracy, efficiency, or both of generating a combined image. In some implementations, the image capture apparatus 300 may maintain information indicating the location and orientation of the lenses 330, 332 and the image sensors 340, 342 such that the fields-of-view 310, 312, stitch points 370, 372, or both may be accurately determined, which may improve the accuracy, efficiency, or both of generating a combined image.

In some implementations, optical axes through the lenses 330, 332 may be substantially antiparallel to each other, such that the respective axes may be within a tolerance such as 1%, 3%, 5%, 10%, and/or other tolerances. In some implementations, the image sensors 340, 342 may be substantially perpendicular to the optical axes through their respective lenses 330, 332, such that the image sensors may be perpendicular to the respective axes to within a tolerance such as 1%, 3%, 5%, 10%, and/or other tolerances.

In some implementations, the lenses 330, 332 may be laterally offset from each other, may be off-center from a central axis of the image capture apparatus 300, or may be laterally offset and off-center from the central axis. As compared to an image capture apparatus with back-to-back lenses (e.g., lenses aligned along the same axis), the image capture apparatus 300 including laterally offset lenses 330, 332 may include substantially reduced thickness relative to the lengths of the lens barrels securing the lenses 330, 332.

For example, the overall thickness of the image capture apparatus 300 may be close to the length of a single lens barrel as opposed to twice the length of a single lens barrel as in a back-to-back configuration. Reducing the lateral distance between the lenses 330, 332 may improve the overlap in the fields-of-view 310, 312.

In some implementations, images or frames captured by an image capture apparatus, such as the image capture apparatus 110 shown in FIG. 1 or the image capture apparatus 300 shown in FIG. 3, may be combined, merged, or stitched together, to produce a combined image, such as a spherical or panoramic image, which may be an equirectangular planar image. In some implementations, generating a combined image may include three-dimensional, or spatiotemporal, noise reduction (3DNR). In some implementations, pixels along the stitching boundary may be matched accurately to minimize boundary discontinuities.

Figure 4:
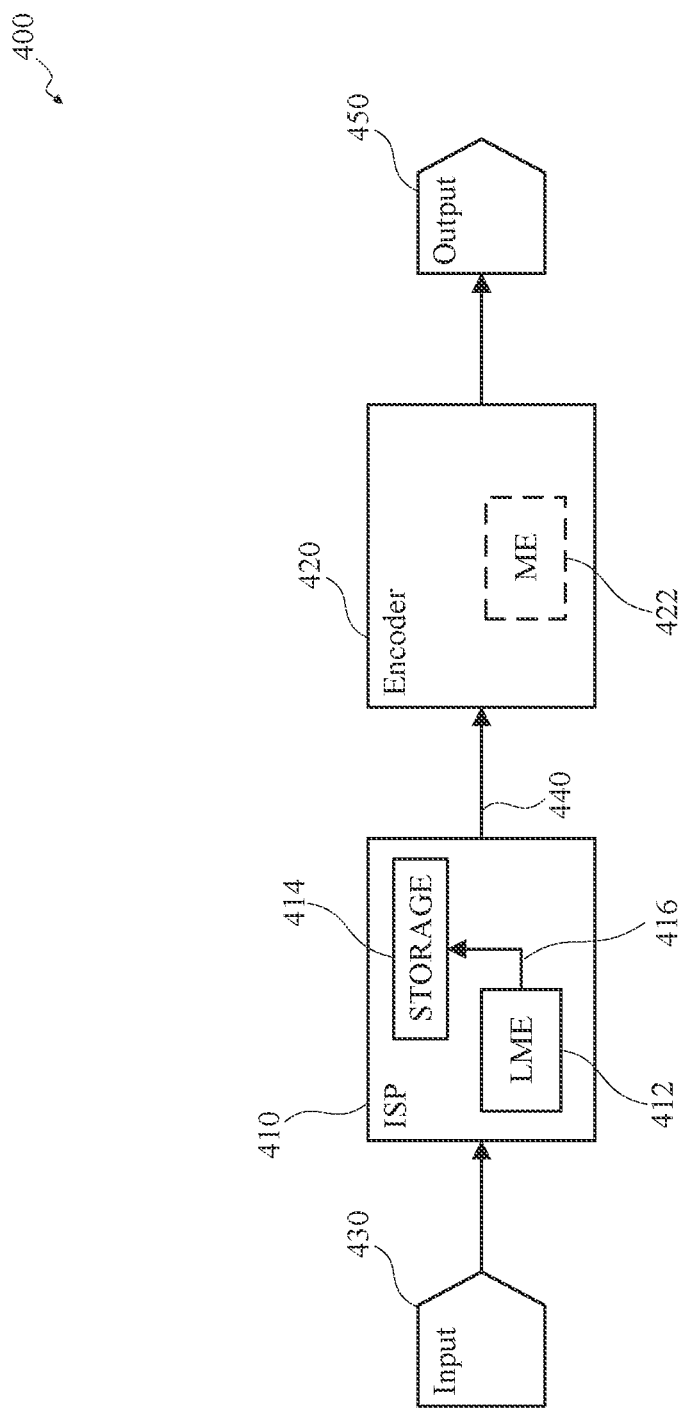
FIG. 4 is a block diagram of an example of an image processing and coding pipeline.

FIG. 4 is a block diagram of an example of an image processing and coding pipeline 400 in accordance with implementations of this disclosure. In some implementations, the image processing and coding pipeline 400 may be included in an image capture device, such as the image capture device 200 shown in FIG. 2, or an image capture apparatus, such as the image capture apparatus 110 shown in FIG. 1 or the image capture apparatus 300 shown in FIG. 3. In some implementations, the image processing and coding pipeline 400 may include an image signal processor (ISP) 410, an encoder 420, or a combination thereof.

The image signal processor 410 may receive an input image signal 430. For example, an image sensor (not shown), such as image sensor 230 shown in FIG. 2, may capture an image, or a portion thereof, and may send, or transmit, the captured image, or image portion, to the image signal processor 410 as the input image signal 430. In some implementations, an image, or frame, such as an image, or frame, included in the input image signal, may be one of a sequence or series of images or frames of a video, such as a sequence, or series, of frames captured at a rate, or frame rate, which may be a number or cardinality of frames captured per defined temporal period, such as 24, 30, or 60 frames per second.

The image signal processor 410 may include a local motion estimation (LME) unit 412, which may generate local motion estimation information for use in image signal processing and encoding, such as in correcting distortion, stitching, and/or motion compensation. In some implementations, the local motion estimation unit 412 may partition the input image signal 430 into blocks (e.g., having 4×4, 16×16, 64×64, and/or other dimensions). In some implementations, the local motion estimation unit 412 may partition the input image signal 430 into arbitrarily shaped patches and/or individual pixels.

The local motion estimation unit 412 may compare pixel values of blocks of pixels between image frames, such as successive image frames, from the input image signal 430 to determine displacement, or movement, between frames. The local motion estimation unit 412 may produce motion vectors (e.g., an x component and y component of motion) at multiple locations within an image frame. The motion vectors may be represented by a translational model or other models that may approximate camera motion, such as rotation and translation in three dimensions, and zooming.

The image signal processor 410 of the image processing and coding pipeline 400 may include electronic storage 414, such as memory (e.g., random access memory (RAM), flash, or other types of memory). The electronic storage 414 may store local motion estimation information 416 determined by the local motion estimation unit 412 for one or more frames. The local motion estimation information 416 and associated image or images may be passed as output 440 to the encoder 420. In some implementations, the electronic storage 414 may include a buffer, or cache, and may buffer the input image signal as an input, or source, image, or frame.

The image signal processor 410 may output an image, associated local motion estimation information 416, or both as the output 440. For example, the image signal processor 410 may receive the input image signal 430, process the input image signal 430, and output a processed image as the output 440. Processing the input image signal 430 may include generating and using the local motion estimation information 416, spatiotemporal noise reduction (3DNR), dynamic range enhancement, local tone adjustment, exposure adjustment, contrast adjustment, image stitching, and/or other operations.

The encoder 420 may encode or compress the output 440 of the image signal processor 410. In some implementations, the encoder 420 may implement the one or more encoding standards, which may include motion estimation.

The encoder 420 may output encoded video as an encoded output 450. For example, the encoder 420 may receive the output 440 of the image signal processor 410, which may include processed images, the local motion estimation information 416, or both. The encoder 420 may encode the images and may output the encoded images as the encoded output 450.

The encoder 420 may include a motion estimation unit 422 that may determine motion information for encoding the image of output 440 of the image signal processor 410. In some implementations, the encoder 420 may encode the image of output 440 of the image signal processor 410 using motion information generated by the motion estimation unit 422 of the encoder 420, the local motion estimation information 416 generated by the local motion estimation unit 412 of the image signal processor 410, or a combination thereof. For example, the motion estimation unit 422 may determine motion information at pixel block sizes that may differ from pixel block sizes used by the local motion estimation unit 412. In another example, the motion estimation unit 422 of the encoder 420 may generate motion information and the encoder may encode the image of output 440 of the image signal processor 410 using the motion information generated by the motion estimation unit 422 of the encoder 420 and the local motion estimation information 416 generated by the local motion estimation unit 412 of the image signal processor 410. In another example, the motion estimation unit 422 of the encoder 420 may use the local motion estimation information 416 generated by the local motion estimation unit 412 of the image signal processor 410 as input for efficiently and accurately generating motion information.

The image signal processor 410, the encoder 420, or both may be distinct units, as shown. For example, the image signal processor 410 may include a motion estimation unit, such as the local motion estimation unit 412 as shown, and/or the encoder 420 may include a motion estimation unit, such as the motion estimation unit 422.

The image signal processor 410 may store motion information, such as the local motion estimation information 416, in a memory, such as the electronic storage 414, and the encoder 420 may read the motion information from the electronic storage 414 or otherwise receive the motion information from the image signal processor 410. The encoder 420 may use the motion estimation information determined by the image signal processor 410 for motion compensation processing.

Figure 5:
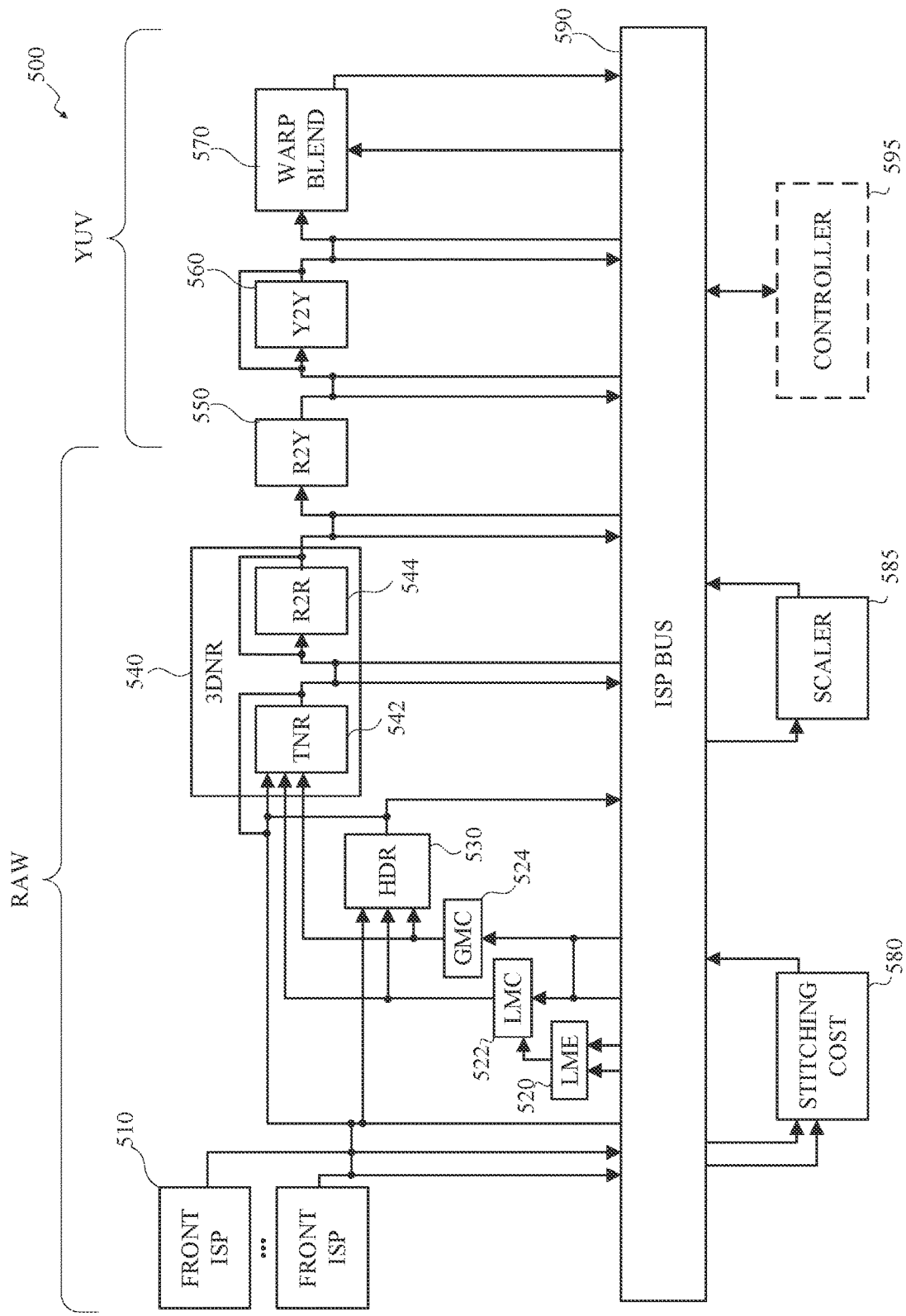
FIG. 5 is a functional block diagram of an example of an image signal processor.

FIG. 5 is a functional block diagram of an example of an image signal processor 500 in accordance with implementations of this disclosure. An image signal processor 500 may be included in an image capture device, such as the image capture device 200 shown in FIG. 2, or an image capture apparatus, such as the image capture apparatus 110 shown in FIG. 1 or the image capture apparatus 300 shown in FIG. 3. In some implementations, the image signal processor 500 may be similar to the image signal processor 410 shown in FIG. 4.

The image signal processor 500 may receive an image signal, such as from an image sensor (not shown), such as the image sensor 230 shown in FIG. 2, in a defined format, such as a format of the image sensor, which may be referred to herein as "RAW," such as "a RAW image," "RAW image data," "RAW data," "a RAW signal," or "a RAW image signal." For example, the RAW image signal may be in a format such as RGB format, which may represent individual pixels using a combination of values or components, such as a red component (R), a green component (G), and a blue component (B). In some implementations, the image signal processor 500 may convert the RAW image data (RGB data) to another format, such as a format expressing individual pixels using a combination of values or components, such as a luminance, or luma, value (Y), a blue chrominance, or chroma, value (U or Cb), and a red chroma value (V or Cr), such as the YUV or YCbCr formats.

The image signal processor 500 may include a front image signal processor (Front ISP) 510, or multiple front image signal processors as shown, a local motion estimation (LME) unit 520, a local motion compensation (LMC) unit 522, a global motion compensation (GMC) unit 524, a high dynamic range (HDR) unit 530, a three-dimensional noise reduction (3DNR) unit 540, which may include a temporal noise reduction (TNR) unit 542 and a RAW to RAW (R2R) unit 544, a RAW to YUV (R2Y) unit 550, a YUV to YUV (Y2Y) unit 560, a warp and blend unit 570, a stitching cost unit 580, a scaler 585, an image signal processor bus (ISP BUS) 590, a configuration controller 595, or a combination thereof.

Although not shown expressly in FIG. 5, in some implementations, one or more of the front image signal processor 510, the local motion estimation unit 520, the local motion compensation unit 522, the global motion compensation unit 524, the high dynamic range unit 530, the three-dimensional noise reduction unit 540, the temporal noise reduction unit 542, the RAW to RAW unit 544, the RAW to YUV unit 550, the YUV to YUV unit 560, the warp and blend unit 570, the stitching cost unit 580, the scaler 585, the image signal processor bus 590, the configuration controller 595, or any combination thereof, may include a respective clock, power domain, or both.

In some implementations, the front image signal processor 510 may minimally process image signals received from respective image sensors, which may include image scaling. Scaling, by the front image signal processor 510, may include processing pixels, such as a defined cardinality of pixels, corresponding to a determined quality. For example, the front image signal processor 510 may correct dead pixels, perform band processing, decouple vertical blanking, or a combination thereof. In some implementations, the front image signal processor 510 may output a high resolution frame, one or more downscaled, or reduced, resolution frames, such as a $\frac{1}{2}\times\frac{1}{2}$ resolution frame, a $\frac{1}{4}\times\frac{1}{4}$ resolution frame, a ⅛×⅛ resolution frame, a 1/16×1/16 resolution frame, a 1/32×1/32 resolution frame, or any combination thereof.

In some implementations, a multiple camera apparatus, such as the image capture apparatus 110 shown in FIG. 1, may include multiple image capture devices, such as the image capture device 200 shown in FIG. 2, and may include a respective front image signal processor 510 associated with each image capture device.

The local motion estimation unit 520 may receive a target image (e.g., a target frame of video) and a reference image (e.g., a reference frame of video) and determine motion information (e.g., a set of motion vectors) that may be used to determine a transformation that may be applied to the reference image to better align image portions (e.g., pixels or blocks of pixels) of the reference image with corresponding image portions of the target image.

The local motion estimation unit 520 may receive, or otherwise access, a target image, or one or more portions thereof, which may be a current input frame, such as via the image signal processor bus 590. In some implementations, the local motion estimation unit 520 may receive the target image, at a downscaled, or reduced, resolution. In some implementations, such as implementations implementing high dynamic range image processing, the target image may be a long exposure input frame.

The local motion estimation unit 520 may receive, or otherwise access, a reference image, or one or more portions thereof, such as via the image signal processor bus 590. In some implementations, such as implementations including temporal noise reduction, the reference image may be a recirculated frame that has been generated based on one or more previous frames of video from an image sensor. For example, the reference image may be a recirculated frame from the three-dimensional noise reduction unit 540. In some implementations, such as implementations including high dynamic range image processing, the reference image may be a short exposure input frame corresponding to the long exposure input frame that will be combined with the long exposure input frame to obtain a high dynamic range frame.

In some implementations, the local motion estimation unit 520 may receive, or otherwise access, previously generated motion information, such as previously generated motion vectors for the target image or motion information for a previously processed frame.

The local motion estimation unit 520 may determine motion information, such as motion vectors, representing motion between the reference image and the target image, such as motion caused by moving objects in the field-of-view or non-rotational motion, or translation, of the field-of-view. The local motion estimation unit 520 may output the motion information. For example, the local motion estimation unit 520 may output motion vectors to the local motion compensation unit 522.

The local motion compensation unit 522 may receive, or otherwise access, a reference image, or one or more portions thereof, such as via the image signal processor bus 590. In some implementations, such as implementations implementing temporal noise reduction processing, the reference image may be a recirculated frame (e.g., from the three-dimensional noise reduction unit 540). In some implementations, such as implementations implementing high dynamic range image processing, the reference image may be the short exposure input frame, where a corresponding long exposure frame has been used as the target image. In some implementations, such as implementations implementing high dynamic range image processing, the reference image may be a long exposure input frame, where a corresponding short exposure frame has been used as the target image.

The local motion compensation unit 522 may receive, or otherwise access, motion information, such as motion vectors, associated with the reference image. For example, the local motion compensation unit 522 may receive the motion vectors from the local motion estimation unit 520.

The local motion compensation unit 522 may generate or obtain a prediction image (e.g., a prediction frame), or a portion thereof, such as a prediction block, which may be a prediction of the target image, or a portion thereof, such as a target block of the target image, based on the reference image, or a portion thereof, and the local motion information. For example, a prediction image may be obtained by applying a transformation, which is based on the local motion information, to the reference image (e.g., a recirculated frame or a short exposure frame). The local motion compensation unit 522 may output a local motion prediction image, or one or more portions thereof, which may be referred to herein as a local motion compensated image (e.g., a local motion compensated frame of video).

The global motion compensation unit 524 may receive, or otherwise access, the reference image, or one or more portions thereof, such as via the image signal processor bus 590. In some implementations, such as implementations implementing temporal noise reduction processing, the reference image may be a recirculated frame (e.g., from the three-dimensional noise reduction unit 540). In some implementations, such as implementations implementing high dynamic range image processing, the reference image may be a short exposure input frame, where a corresponding long exposure input frame has been used as the target image. In some implementations, such as implementations implementing high dynamic range image processing, the reference image may be a long exposure input frame, where a corresponding short exposure input frame has been used as the target image.

The global motion compensation unit 524 may receive, or otherwise access, global motion information, such as global motion information from a gyroscopic unit of the image capture apparatus, such as a gyroscopic sensor included in the metadata unit 232 shown in FIG. 2, corresponding to a time period between capture of the reference image and capture of the target image. The global motion information may indicate a non-translational change in the orientation of the field-of-view relative to the content captured in respective images. For example, the global motion information may indicate a horizontal change of the field-of-view, which may indicate that the corresponding camera panned, or rotated, around a vertical axis. In another example, the global motion information may indicate a vertical change of the field-of-view, which may indicate that the camera tilted or rotated around an axis perpendicular to the lens. In another example, the global motion information may indicate a rotational change of the field-of-view relative to the horizon, which may indicate that the camera rolled or rotated around an axis parallel to the lens. The global motion information may be distinct from motion information, such as translation motion information, indicating a change in the geospatial location of the image capture apparatus, which may include a change associated with changing an elevation of the image capture apparatus.

The global motion compensation unit 524 may generate or obtain a prediction image (e.g., a prediction frame of video), or a portion thereof, such as a prediction block, which may be a prediction of the target image, or a portion thereof, such as a target block of the target image, based on the reference image, or a portion thereof, and the global motion information. For example, a prediction image may be obtained by applying a transformation, which is based on the global motion information, to the reference image (e.g., a recirculated frame or a short exposure frame). The global motion compensation unit 524 may output a global motion prediction image, or one or more portions thereof, which may be referred to herein as a global motion compensated image (e.g., a global motion compensated frame of video).

The high dynamic range unit 530 may receive, or otherwise access, (e.g., from the front image signal processor 510) multiple images of a scene that have been captured with different exposure times. The high dynamic range unit 530 may combine the images captured with different exposure times to obtain a high dynamic range image. For example, the high dynamic range unit 530 may combine two images, a long exposure image and a short exposure image, to obtain a high dynamic range image. For example, image portions (e.g., pixels or blocks of pixels) of the high dynamic range image may be determined based on corresponding image portions the short exposure image where the respective image portions of the long exposure image have saturated pixel values and may otherwise determine image portions of the high dynamic range based on corresponding image portions the long exposure image. In some implementations, motion compensation (e.g., local motion compensation by the local motion compensation unit 522 and/or global motion compensation by the global motion compensation unit 524) may be applied to either the long exposure image or the short exposure image to better align pixels corresponding to objects appearing in the field of view of the two input images. For example, the high dynamic range unit 530 may combine a long exposure image with a motion compensated short exposure image. For example, the high dynamic range unit 530 may combine a short exposure image with a motion compensated long exposure image. The high dynamic range unit 530 may receive, or otherwise access, the local motion prediction image, or a portion thereof, from the local motion compensation unit 522. The high dynamic range unit 530 may receive, or otherwise access, the global motion prediction image, or a portion thereof, from the global motion compensation unit 524.

The high dynamic range unit 530 may output the high dynamic range image. For example, the high dynamic range unit 530 may output the high dynamic range image by storing the high dynamic range image in memory, such as shared memory, via the image signal processor bus 590, or the high dynamic range unit 530 may output the high dynamic range image directly to another unit of the image signal processor 500, such as the temporal noise reduction unit 542.

In some implementations, the high dynamic range unit 530 may be omitted, or high dynamic range processing by the high dynamic range unit 530 may be omitted.

The three-dimensional noise reduction unit 540 may include the temporal noise reduction (TNR) unit 542, the RAW to RAW (R2R) unit 544, or both.

The temporal noise reduction unit 542 may receive the current input frame, or one or more portions thereof, such as from the front image signal processor 510 or via the image signal processor bus 590. In some implementations, such as implementations implementing high dynamic range image processing, the temporal noise reduction unit 542 may receive the high dynamic range input frame, or one or more portions thereof, such as from the high dynamic range unit 530, as the current input frame.

The temporal noise reduction unit 542 may receive, or otherwise access, a local motion prediction frame from the local motion compensation unit 522. The temporal noise reduction unit 542 may receive, or otherwise access, the global motion prediction frame from the global motion compensation unit 524.

The temporal noise reduction unit 542 may reduce temporal noise in the current input frame, which may include recursively reducing temporal noise in a sequence of input images, such as a video. Recursive temporal noise reduction may include combining a current image from a sequence of images (e.g., a current frame from a video) with a recirculated image that is based on one or more previous images from the sequence of images to obtain a noise reduced image. Details of this combination (e.g., mixing weights for respective image portions) may be determined based on noise level information (e.g., a noise map) for the recirculated image.

The temporal noise reduction unit 542 may generate output including a pixel value and associated noise variance for the pixel value for one or more pixels of the noise reduced image (e.g., the noise reduced frame).

The RAW to RAW unit 544 may perform spatial denoising of frames of RAW images (e.g., frames of video). In some implementations, the RAW to RAW unit 544 may implement non-local means processing to reduce noise of a frame by determining weighted averages of pixels within the frame, where the weights depend on the similarity of the intensity or color between pixels. In some implementations, the weights may be based on noise variance values received from the temporal noise reduction unit 542. In some implementations, noise variance values for pixels of an image may be updated based on weights (e.g., non-local means weights) used to combine pixels of the image for spatial denoising, and these updated noise variance values may be recirculated. Spatial denoising (e.g., non-local means denoising) in the RAW to RAW unit 544 may include multiple passes of image signal processing, including passes at various resolutions.

The RAW to YUV unit 550 may demosaic, and/or color process, the frames of RAW images, which may include representing each pixel in the YUV format, which may include a combination of a luminance (Y) component and two chrominance (UV) components.

The YUV to YUV unit 560 may perform local tone mapping of YUV images. In some implementations, the YUV to YUV unit 560 may include multi-scale local tone mapping using a single pass approach or a multi-pass approach on a frame at different scales.

The warp and blend unit 570 may warp images, blend images, or both. In some implementations, the warp and blend unit 570 may warp a corona around the equator of each frame to a rectangle. For example, the warp and blend unit 570 may warp a corona around the equator of each frame to a rectangle based on the corresponding low resolution frame generated by the front image signal processor 510.

The warp and blend unit 570 may apply one or more transformations to the frames. In some implementations, spherical images produced by a multi-face camera device, such as the image capture apparatus 110 shown in FIG. 1 or the image capture apparatus 300 shown in FIG. 3, may be warped and/or blended by the warp and blend unit 570 to correct for distortions at image edges. In some implementations, the warp and blend unit 570 may apply a transformation that is subject to a close to identity constraint, wherein a location of a pixel in an input image to the warp and blend unit 570 may be similar to, such as within a defined distance threshold of, a location of a corresponding pixel in an output image from the warp and blend unit 570. For example, the warp and blend unit 570 may include an internal memory, which may have a size, such as 100 lines, which may be smaller than a size of a frame, and the warp and blend unit 570 may process the input image data in raster-in/raster-out order using a transformation that is subject to a close to identity constraint.

In some implementations, the warp and blend unit 570 may apply a transformation that is independent of close to identity constraints, which may include processing the input image data in raster-in/dynamic-out or dynamic-in/raster-out order. For example, the warp and blend unit 570 may transform two or more non-rectilinear (fisheye) images to generate a combined frame, such as an equirectangular frame, by processing the input image data in raster-in/dynamic-out or dynamic-in/raster-out order.

The stitching cost unit 580 may generate a stitching cost map as an output. In some implementations, the cost map may be represented as a rectangle having disparity x and longitude y based on a warping. Each value of the cost map may be a cost function of a disparity x value for a corresponding longitude. Cost maps may be generated for various scales, longitudes, and disparities.

The scaler 585 may scale images received from the output of the warp and blend unit 570, which may be in patches, or blocks, of pixels, such as 16×16 blocks, 8×8 blocks, or patches or blocks of any other size or combination of sizes.

The image signal processor bus 590 may be a bus or interconnect, such as an on-chip interconnect or embedded microcontroller bus interface, for communication between the front image signal processor 510, the temporal noise reduction unit 542, the local motion compensation unit 522, the RAW to RAW unit 544, the RAW to YUV unit 550, the YUV to YUV unit 560, the combined warp and blend unit 570, the stitching cost unit 580, the scaler 585, the configuration controller 595, or any combination thereof.

The configuration controller 595 may coordinate image processing by the front image signal processor 510, the local motion estimation unit 520, the local motion compensation unit 522, the global motion compensation unit 524, the high dynamic range unit 530, the three-dimensional noise reduction unit 540, the temporal noise reduction unit 542, the RAW to RAW unit 544, the RAW to YUV unit 550, the YUV to YUV unit 560, the warp and blend unit 570, the stitching cost unit 580, the scaler 585, the image signal processor bus 590, or any combination thereof, of the image signal processor 500. For example, the configuration controller 595 may control camera alignment model calibration, auto-exposure, auto-white balance, or any other camera calibration or similar process or combination of processes. In some implementations, the configuration controller 595 may be a microcontroller. The configuration controller 595 is shown in FIG. 5 using broken lines to indicate that the configuration controller 595 may be included in the image signal processor 500 or may be external to, and in communication with, the image signal processor 500. The configuration controller 595 may include a respective clock, power domain, or both.

FIG. 6A is a block diagram of an example of a system 600 configured for image capture and denoising. The system 600 includes an image capture device 610 (e.g., a camera or a drone) that includes a processing apparatus 612 that is configured to receive a first image from a first image sensor 614 and receive a second image from a second image sensor 616. The processing apparatus 612 may be configured to perform image signal processing (e.g., denoising, stitching, and/or encoding) to generated composite images based on image data from the image sensors 614 and 616. The image capture device 610 includes a communications interface 618 for transferring images to other devices. The image capture device 610 includes a user interface 620, which may allow a user to control image capture functions and/or view images. The image capture device 610 includes a battery 622 for powering the image capture device 610. The components of the image capture device 610 may communicate with each other via a bus 624. The system 600 may be used to implement processes described in this disclosure, such as the process 900 of FIG. 9 and/or the process 1000 of FIG. 10.

The processing apparatus 612 may include one or more processors having single or multiple processing cores. The processing apparatus 612 may include memory, such as random access memory device (RAM), flash memory, or any other suitable type of storage device such as a non-transitory computer readable memory. The memory of the processing apparatus 612 may include executable instructions and data that can be accessed by one or more processors of the processing apparatus 612. For example, the processing apparatus 612 may include one or more DRAM modules such as double data rate synchronous dynamic random-access memory (DDR SDRAM). In some implementations, the processing apparatus 612 may include a digital signal processor (DSP). In some implementations, the processing apparatus 612 may include an application specific integrated circuit (ASIC). For example, the processing apparatus 612 may include an image signal processor.

The first image sensor 614 and the second image sensor 616 are configured to capture images. The first image sensor 614 and the second image sensor 616 are configured to detect light of a certain spectrum (e.g., the visible spectrum or the infrared spectrum) and convey information constituting an image as electrical signals (e.g., analog or digital signals). For example, the image sensors 614 and 616 may include charge-coupled devices (CCD) or active pixel sensors in complementary metal-oxide-semiconductor (CMOS). The image sensors 614 and 616 may detect light incident through respective lens (e.g., a fisheye lens). In some implementations, the image sensors 614 and 616 include digital to analog converters. In some implementations, the image sensors 614 and 616 are held in a fixed orientation with respective fields of view that overlap. For example, the image sensors 614 and 616 may be configured to capture image data using a plurality of selectable exposure times.

The image capture device 610 may include the communications interface 618, which may enable communications with a personal computing device (e.g., a smartphone, a tablet, a laptop computer, or a desktop computer). For example, the communications interface 618 may be used to receive commands controlling image capture and processing in the image capture device 610. For example, the communications interface 618 may be used to transfer image data to a personal computing device. For example, the communications interface 618 may include a wired interface, such as a high-definition multimedia interface (HDMI), a universal serial bus (USB) interface, or a FireWire interface. For example, the communications interface 618 may include a wireless interface, such as a Bluetooth interface, a ZigBee interface, and/or a Wi-Fi interface.

The image capture device 610 may include the user interface 620. For example, the user interface 620 may include an LCD display for presenting images and/or messages to a user. For example, the user interface 620 may include a button or switch enabling a person to manually turn the image capture device 610 on and off. For example, the user interface 620 may include a shutter button for snapping pictures. In some implementations, the user interface 620 includes a touchscreen display. For example, the touchscreen display may be configured to present a user interface including a slider interface for selecting an adjustable field of view for the image capture device 610. For example, a field of view selection may be received via the slider interface. In some implementations, a low power preview mode may be terminated responsive to detection of a framing event based on touch data from the touchscreen display.

The image capture device 610 may include the battery 622 that powers the image capture device 610 and/or its peripherals. For example, the battery 622 may be charged wirelessly or through a micro-USB interface.

The image capture device 610 may include other components not shown in FIG. 6A. For example, the image capture device 610 may include one or more motion sensors, such as a gyroscope, and accelerometer, and/or a magnetometer. For example, a low power preview mode of the image capture device 610 may be terminated responsive to detection of a framing event based on angular rate data from the gyroscope.

FIG. 6B is a block diagram of an example of a system 630 configured for image capture and denoising. The system 630 includes an image capture device 640 that communicates via a communications link 650 with a personal computing device 660. The image capture device 640 includes a first image sensor 642 and a second image sensor 644 that are configured to capture respective images. The image capture device 640 includes a communications interface 646 configured to transfer images via the communication link 650 to the personal computing device 660. The personal computing device 660 includes a processing apparatus 662, a user interface 664, and a communications interface 666. The processing apparatus 662 is configured to receive, using the communications interface 666, a first image from the first image sensor 642, and receive a second image from the second image sensor 644. The processing apparatus 662 may be configured to perform image signal processing (e.g., denoising, stitching, and/or encoding) to generated composite images based on image data from the image sensors 642 and 644. The system 630 may be used to implement processes described in this disclosure, such as the process 900 of FIG. 9 and/or the process 1000 of FIG. 10.

The first image sensor 642 and the second image sensor 644 are configured to capture images. The first image sensor 642 and the second image sensor 644 are configured to detect light of a certain spectrum (e.g., the visible spectrum or the infrared spectrum) and convey information constituting an image as electrical signals (e.g., analog or digital signals). For example, the image sensors 642 and 644 may include charge-coupled devices (CCD) or active pixel sensors in complementary metal-oxide-semiconductor (CMOS). The image sensors 642 and 644 may detect light incident through respective lens (e.g., a fisheye lens). In some implementations, the image sensors 642 and 644 include digital to analog converters. In some implementations, the image sensors 642 and 644 are held in a fixed relative orientation with respective fields of view that overlap. For example, the image sensors 642 and 644 may be configured to capture image data using a plurality of selectable exposure times. Image signals from the image sensors 642 and 644 may be passed to other components of the image capture device 640 via a bus 648.

The communications link 650 may be wired communications link or a wireless communications link. The communications interface 646 and the communications interface 666 may enable communications over the communications link 650. For example, the communications interface 646 and the communications interface 666 may include a high-definition multimedia interface (HDMI), a universal serial bus (USB) interface, a FireWire interface, a Bluetooth interface, a ZigBee interface, and/or a Wi-Fi interface. For example, the communications interface 646 and the communications interface 666 may be used to transfer image data from the image capture device 640 to the personal computing device 660 for image signal processing (e.g., denoising, stitching, and/or encoding) to generated composite images based on image data from the image sensors 642 and 644.

The processing apparatus 662 may include one or more processors having single or multiple processing cores. The processing apparatus 662 may include memory, such as random access memory device (RAM), flash memory, or any other suitable type of storage device such as a non-transitory computer readable memory. The memory of the processing apparatus 662 may include executable instructions and data that can be accessed by one or more processors of the processing apparatus 662. For example, the processing apparatus 662 may include one or more DRAM modules such as double data rate synchronous dynamic random-access memory (DDR SDRAM). In some implementations, the processing apparatus 662 may include a digital signal processor (DSP). In some implementations, the processing apparatus 662 may include an application specific integrated circuit (ASIC). For example, the processing apparatus 662 may include an image signal processor. The processing apparatus 662 may exchange data (e.g., image data) with other components of the personal computing device 660 via the bus 668.

The personal computing device 660 may include the user interface 664. For example, the user interface 664 may include a touchscreen display for presenting images and/or messages to a user and receiving commands from a user. For example, the user interface 664 may include a button or switch enabling a person to manually turn the personal computing device 660 on and off In some implementations, commands (e.g., start recording video, stop recording video, or snap photograph) received via the user interface 664 may be passed on to the image capture device 640 via the communications link 650. In some implementations, the user interface 664 includes a touchscreen display. For example, the touchscreen display may be configured to present a user interface including a slider interface for selecting an adjustable field of view for the image capture device 610. For example, a field of view selection may be received via the slider interface. In some implementations, a low power preview mode may be terminated responsive to detection of a framing event based on touch data from the touchscreen display.

Figure 7:
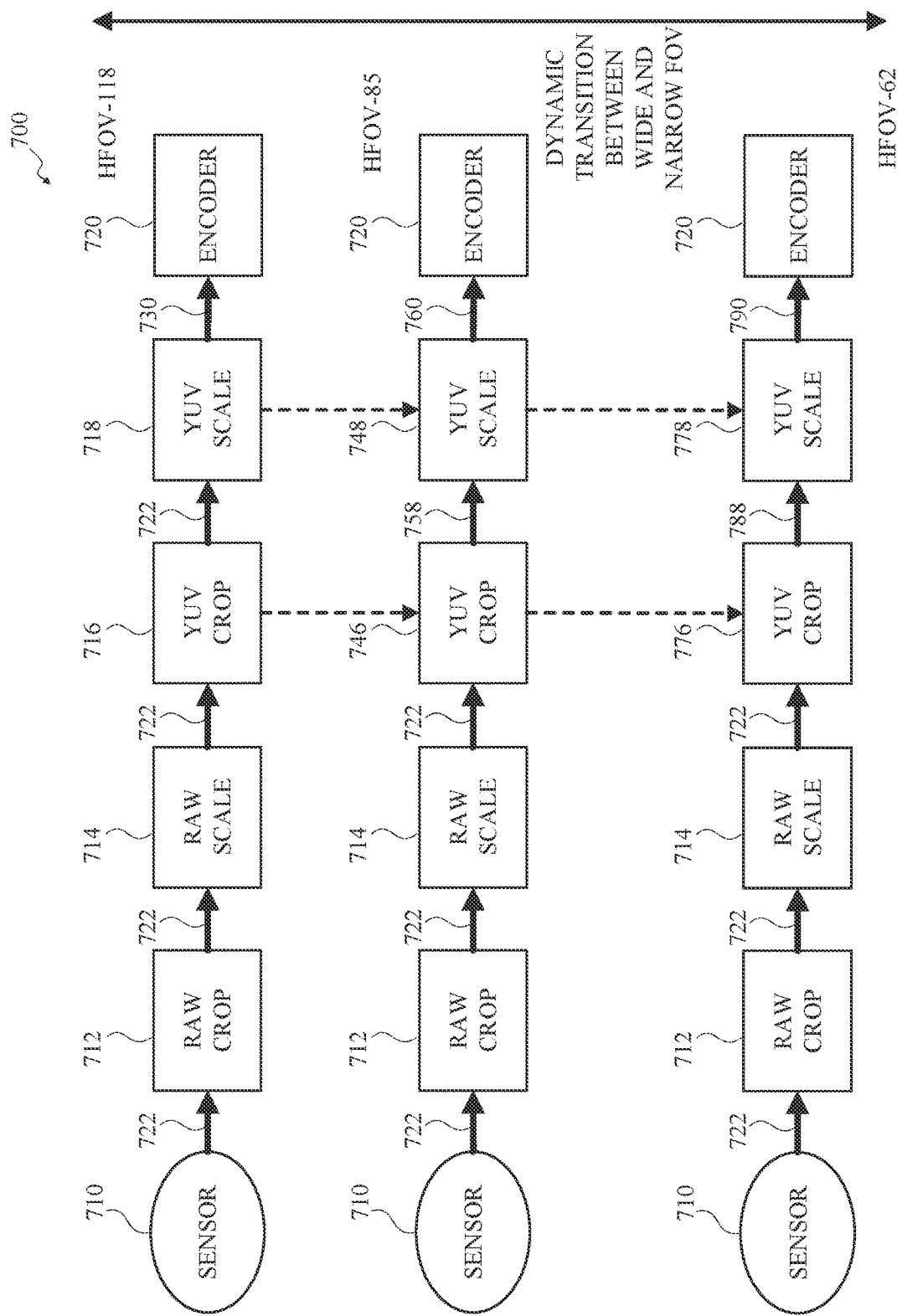
FIG. 7 is a block diagram of an example of an image processing pipeline with an adjustable field of view for capturing images.

FIG. 7 is a block diagram of an example of an image processing pipeline 700 with an adjustable field of view for capturing images. In this example, the image processing pipeline 700 implements smooth field of view adjustment, which may also be referred to a digital zoom function for encoding images with a 1080p encode resolution. The image processing pipeline 700 includes an image sensor 710, a RAW domain crop module 712, a RAW domain scale module 714, a YUV domain crop module 716, a YUV domain scale module 718, and an encoder 720. The image sensor 710 is configured to oversample to obtain an image 722 (e.g., a still image or a frame of video) at a capture resolution (e.g., 3840×2160 pixels) that is greater than an encode resolution (e.g., 1920×1080 pixels) used by the encoder 720. The captured image 722 may have a full field of view (FOV) for the image sensor 710, i.e., a largest available field of view using the image sensor (e.g., 118 degrees horizontal field of view (HFOV)). The image processing pipeline 700 may be configured to dynamically adjust the field of view of the images (e.g., 730, 760, and 790) that are passed to the encoder at the encode resolution (e.g. 1920×1080 pixels) for encoding. The dynamic adjustment of the field of view may be implemented by adjusting parameters of the RAW domain crop module 712, the RAW domain scale module 714, the YUV domain crop module 716, and/or the YUV domain scale module 718 to effect a change in field of view by cropping and/or downscaling the image, while avoiding upscaling the image. FIG. 7 illustrates three configurations of the image processing pipeline 700, corresponding to the three rows in FIG. 7, that are configured to realize three different field of view settings (e.g., 118 degrees HFOV, 85 degrees HFOV, and 62 degrees HFOV) taken as examples from a range of available field of view settings from a widest field of view (e.g., 118 degrees HFOV) to a narrowest field of view (e.g., 62 degrees HFOV). Smooth field of view adjustment or zoom is achieved by passing the oversampled image at the full capture resolution (e.g., 3840×2160 pixels) without scaling in a RAW domain, and cropping and down-scaling in a YUV domain to obtain an image at the encode resolution (e.g. 1920×1080 pixels) with the desired field of view.

In the example of the image processing pipeline 700, the field of view is dynamically adjusted by adjusting settings of the YUV domain crop module 716 to crop to a desired field of view and adjusting settings of the YUV domain scale module 718 in a corresponding manner to perform any down-scaling to keep the encode resolution for images passed to the encoder 720 consistent. For example, the image processing pipeline 700 may have sufficient computational bandwidth and may lack a scaling ratio limitation, which may allow all cropping and scaling to be performed in the YUV domain after initial processing (e.g., correction of dead pixels, band processing, decoupling of vertical blanking, and/or noise reduction processing) is performed in the RAW domain at the higher capture resolution (e.g., 3840×2160 pixels). By avoiding upscaling, image quality of the encoded images may be enhanced compared to conventional zoom or field of view adjustment systems that use upscaling, since upscaling may introduce significant blurring or other distortion to images. For example, the image processing pipeline 700 may be included in the image capture device 610 of FIG. 6A. For example, the image processing pipeline 700 may be included in the system 630 of FIG. 6B. In some implementations, the image processing pipeline 700 may be included in an image capture apparatus, such as the image capture apparatus 110 shown in FIG. 1 or the image capture apparatus 300 shown in FIG. 3. For example, the image processing pipeline 700 may be used to implement the process 900 of FIG. 9.

The image processing pipeline 700 includes an image sensor 710 that is used to oversample to obtain an image 722 (e.g., a frame of video) at a capture resolution (e.g., 3840×2160 pixels) that is greater than an encode resolution (e.g., 1920×1080 pixels) used by the encoder 720. For example, the image sensor 710 may include the image sensor 230, the image sensor 614, or the image sensor 642. In some implementations, the image 722 is passed from the image sensor 710 to an image signal processor for processing prior to encode. For example, the processing performed by the image signal processor may include cropping the image using a crop setting to obtain a cropped image (e.g., 728, 758, or 788), and down-scaling the cropped image to obtain a scaled image (e.g., 730, 760, or 790) at the encode resolution.

The RAW domain crop module 712 is disabled or configured to pass the image 722 without changing the field of view or the resolution. The RAW domain scale module 714 is disabled or configured to pass the image 722 without changing the field of view or the resolution. The image 722 that is output from the RAW domain scale module 714 and input to the YUV domain crop module (716, 746, and 776) may be subject to intervening processing not impacting the size of the image 722. For example, the image 722 is subject to RAW to YUV conversion (e.g., using the RAW to YUV unit 550) may be subject additional image processing (e.g., image processing described in relation to the image signal processor 500). The YUV domain crop module (716, 746, and 776) is configured to allow dynamic adjustment of one or more cropping settings to adjust a field of view of the image 722 by cropping the image 722. The YUV domain scale module (718, 748, and 778) is configured to allow dynamic adjustment of one or more scaling settings to adjust a resolution of the cropped image by down-scaling the cropped image to the encode resolution.

In a first configuration, corresponding to the first row in FIG. 7, the YUV domain crop module 716 is configured to pass the image 722 (e.g., 118 degrees HFOV and 3840×2160 pixels) without changing the field of view or the resolution. The YUV domain scale module 718 is configured to down-scale the image 722 to obtain a scaled image 730 with the widest field of view at the encode resolution (e.g., 118 degrees HFOV and 1920×1080 pixels). The scaled image 730 is passed to the encoder 720 for encoding (e.g., JPEG, MPEG, or VP9 encoding).

In a second configuration, corresponding to the second row in FIG. 7, the YUV domain crop module 746 is configured with one or more crop settings to crop the image 722 to obtain a cropped image 758 with a field of view reduced to an intermediate field of view (e.g., 85 degree HFOV and 2704×1520 pixels). The YUV domain scale module 748 is configured to down-scale the cropped image 758 to obtain a scaled image 760 with the intermediate field of view at the encode resolution (e.g., 85 degrees HFOV and 1920×1080 pixels). The scaled image 760 is passed to the encoder 720 for encoding (e.g., JPEG, MPEG, or VP9 encoding).

In a third configuration, corresponding to the third row in FIG. 7, the YUV domain crop module 776 is configured with one or more crop settings to crop the image 722 to obtain a cropped image 788 with a field of view reduced to an narrowest field of view (e.g., 62 degree HFOV and 1920×1080 pixels). The YUV domain scale module 778 is configured to down-scale the cropped image 788 to obtain a scaled image 790 with the narrowest field of view at the encode resolution (e.g., 62 degrees HFOV and 1920×1080 pixels). The scaled image 760 is passed to the encoder 720 for encoding (e.g., JPEG, MPEG, or VP9 encoding).

For example, the encoder 720 may include the encoder 420 of FIG. 4.

Other configurations (not shown in FIG. 7) of the YUV domain crop module and the YUV domain scale module may be used to dynamically obtain images at additional intermediate fields of view from along the range between the widest available field of view and the narrowest available field of view.

In some implementations, a combination of RAW domain cropping and/or scaling and YUV domain cropping and/or scaling is used to obtain images with a desired field of view at an encode resolution, while avoiding up-scaling to achieve smooth field of view adjustment/zoom. For example, a system may have a scaling ratio limitation in the YUV domain. For example, a YUV down-scaling ratio may be constrained to be less than 1.75×, meaning the incoming resolution can be up to 1.75 times the outgoing resolution.

Figure 8:
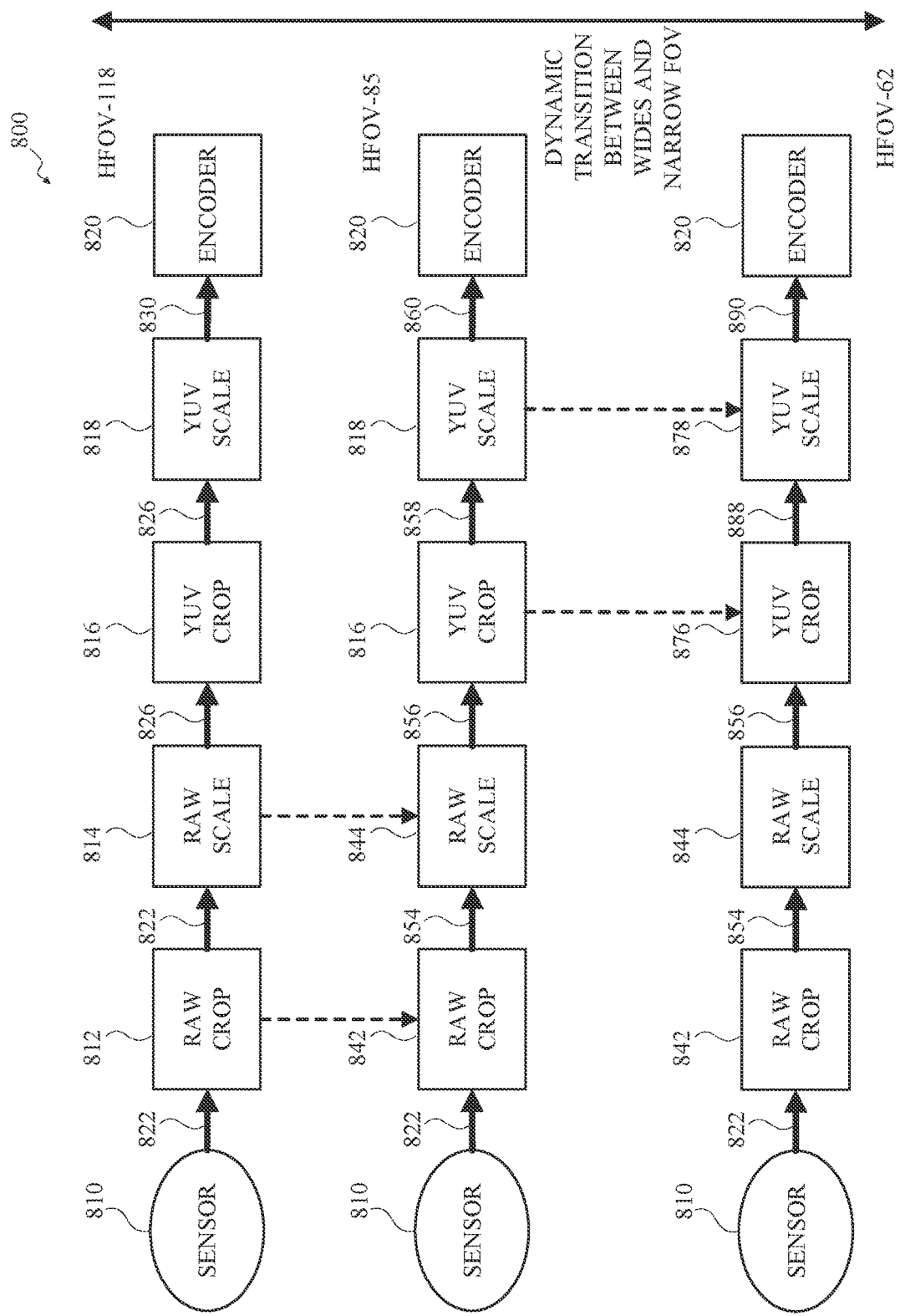
FIG. 8 is a block diagram of an example of an image processing pipeline with an adjustable field of view for capturing images with a limited YUV domain down-scaling ratio.

FIG. 8 is a block diagram of an example of an image processing pipeline 800 with an adjustable field of view for capturing images with a limited YUV domain down-scaling ratio. In this example, the image processing pipeline 800 implements smooth field of view adjustment, which may also be referred to a digital zoom function for encoding images with a 1080p encode resolution. The image processing pipeline 800 includes an image sensor 810, a RAW domain crop module 812, a RAW domain scale module 814, a YUV domain crop module 816, a YUV domain scale module 818, and an encoder 820. The image sensor 810 is configured to oversample to obtain an image 822 (e.g., a still image or a frame of video) at a capture resolution (e.g., 3840×2160 pixels) that is greater than an encode resolution (e.g., 1920×1080 pixels) used by the encoder 820. The captured image 822 may have a full field of view (FOV) for the image sensor 810, i.e., a largest available field of view using the image sensor (e.g., 118 degrees horizontal field of view (HFOV)). The image processing pipeline 800 may be configured to dynamically adjust the field of view of the images (e.g., 830, 860, and 890) that are passed to the encoder at the encode resolution (e.g. 1920×1080 pixels) for encoding. The dynamic adjustment of the field of view may be implemented by adjusting parameters of the RAW domain crop module 812, the RAW domain scale module 814, the YUV domain crop module 816, and/or the YUV domain scale module 818 to effect a change in field of view by cropping and/or downscaling the image, while avoiding upscaling the image. FIG. 8 illustrates three configurations of the image processing pipeline 800, corresponding to the three rows in FIG. 8, that are configured to realize three different field of view settings (e.g., 118 degrees HFOV, 85 degrees HFOV, and 62 degrees HFOV) taken as examples from a range of available field of view settings from a widest field of view (e.g., 118 degrees HFOV) to a narrowest field of view (e.g., 62 degrees HFOV). Smooth field of view adjustment or zoom is achieved by cropping the oversampled image at the full capture resolution (e.g., 3840×2160 pixels) and down-scaling in a RAW domain, and/or cropping and down-scaling in a YUV domain to obtain an image at the encode resolution (e.g. 1920×1080 pixels) with the desired field of view.

In the example of the image processing pipeline 800, the field of view is dynamically adjusted by adjusting settings of the RAW domain crop module 812 to crop to a desired field of view and adjusting settings of the RAW domain scale module 814 in a corresponding manner to perform any down-scaling to keep an intermediate resolution for images passed to downstream processing of the image processing pipeline 800 (including the YUV domain scale module 818) consistent, and/or adjusting settings of the YUV domain crop module 816 to crop to a desired field of view and adjusting settings of the YUV domain scale module 818 in a corresponding manner to perform any downscaling to get to keep the encode resolution for images passed to the encoder 820 consistent. For example, the image processing pipeline 800 may have computational bandwidth limitations and/or may a YUV scaling ratio limitation, which may be overcome by performing some cropping and scaling in the RAW domain before initial image processing (e.g., correction of dead pixels, band processing, decoupling of vertical blanking, and/or noise reduction processing) is performed in the RAW domain at the intermediate resolution (e.g., 2704×1520 pixels). By avoiding upscaling, image quality of the encoded images may be enhanced compared to conventional zoom or field of view adjustment systems that use upscaling, since upscaling may introduce significant blurring or other distortion to images. For example, the image processing pipeline 800 may be included in the image capture device 610 of FIG. 6A. For example, the image processing pipeline 800 may be included in the system 630 of FIG. 6B. In some implementations, the image processing pipeline 800 may be included in an image capture apparatus, such as the image capture apparatus 110 shown in FIG. 1 or the image capture apparatus 300 shown in FIG. 3. For example, the image processing pipeline 800 may be used to implement the process 900 of FIG. 9. For example, the image processing pipeline 800 may be used to implement the process 1000 of FIG. 10.

The image processing pipeline 800 includes an image sensor 810 that is used to oversample to obtain an image 822 (e.g., a frame of video) at a capture resolution (e.g., 3840×2160 pixels) that is greater than an encode resolution (e.g., 1920×1080 pixels) used by the encoder 820. For example, the image sensor 810 may include the image sensor 230, the image sensor 614, or the image sensor 642. In some implementations, the image 822 is passed from the image sensor 810 to an image signal processor for processing prior to encode. For example, the processing performed by the image signal processor may include cropping the image using a crop setting to obtain a cropped image (e.g., 856 or 888), and down-scaling the cropped image to obtain a scaled image (e.g., 830, 860, or 890) at the encode resolution.

The RAW domain crop module (812 and 842) is configured to allow dynamic adjustment of one or more cropping settings to adjust a field of view of the image 822 by cropping the image 822. The RAW domain scale module (814 and 844) is configured to allow dynamic adjustment of one or more scaling settings to adjust a resolution of the cropped image by down-scaling the cropped image to an intermediate resolution (e.g., 2704×1520 pixels) that satisfies a constraint on the resolution supported by downstream components of the image processing pipeline 800, including the YUV domain scale module 818. The YUV domain crop module (816 and 886) is configured to allow dynamic adjustment of one or more cropping settings to adjust a field of view of the image (826 or 856) by cropping the image. The YUV domain scale module (818 and 878) is configured to allow dynamic adjustment of one or more scaling settings to adjust a resolution of the cropped image by down-scaling the cropped image to the encode resolution (e.g., 1920×1080 pixels).

In a first configuration, corresponding to the first row in FIG. 8, the RAW domain crop module 812 is disabled or configured to pass the image 822 without changing the field of view or the resolution. The RAW domain scale module 814 is configured to down-scale the image 822 to obtain a RAW scaled image 826 at the intermediate resolution. The image 826 that is output from the RAW domain scale module 814 and input to the YUV domain crop module 816 may be subject to intervening processing not impacting the size of the image. For example, the image 826 is subject to RAW to YUV conversion (e.g., using the RAW to YUV unit 550) and may be subject additional image processing (e.g., image processing described in relation to the image signal processor 500). The YUV domain crop module 816 is configured to pass the image 826 (e.g., 118 degrees HFOV and 2704×1520 pixels) without changing the field of view or the resolution. The YUV domain scale module 818 is configured to down-scale the image 826 to obtain a scaled image 830 with the widest field of view at the encode resolution (e.g., 118 degrees HFOV and 1920×1080 pixels). The scaled image 830 is passed to the encoder 820 for encoding (e.g., JPEG, MPEG, or VP9 encoding).

In a second configuration, corresponding to the second row in FIG. 8, the RAW domain crop module 842 is configured with one or more crop settings to crop the image 822 to obtain a RAW cropped image 854 with a field of view reduced to an intermediate field of view (e.g., 85 degree HFOV and 2704×1520 pixels). The RAW domain scale module 844 is configured to down-scale the RAW cropped image 854 to obtain a RAW scaled image 856 at the intermediate resolution (e.g., 85 degrees HFOV and 2704×1520 pixels). The image 826 that is output from the RAW domain scale module 844 and input to the YUV domain crop module 816 may be subject to intervening processing not impacting the size of the image. For example, the image 856 is subject to RAW to YUV conversion (e.g., using the RAW to YUV unit 550) and may be subject additional image processing (e.g., image processing described in relation to the image signal processor 500). The YUV domain crop module 816 is configured to pass the image 856 (e.g., 85 degrees HFOV and 2704×1520 pixels) without changing the field of view or the resolution. The YUV domain scale module 818 is configured to down-scale the cropped image 858 to obtain a scaled image 860 with the intermediate field of view at the encode resolution (e.g., 85 degrees HFOV and 1920×1080 pixels). The scaled image 860 is passed to the encoder 820 for encoding (e.g., JPEG, MPEG, or VP9 encoding).

In a third configuration, corresponding to the third row in FIG. 8, the RAW domain crop module 842 is configured with one or more crop settings to crop the image 822 to obtain a RAW cropped image 854 with a field of view reduced to an intermediate field of view (e.g., 85 degree HFOV and 2704×1520 pixels). The RAW domain scale module 844 is configured to down-scale the RAW cropped image 854 to obtain a RAW scaled image 856 at the intermediate resolution (e.g., 85 degrees HFOV and 2704×1520 pixels). The image 826 that is output from the RAW domain scale module 844 and input to the YUV domain crop module 816 may be subject to intervening processing not impacting the size of the image. For example, the image 856 is subject to RAW to YUV conversion (e.g., using the RAW to YUV unit 550) and may be subject additional image processing (e.g., image processing described in relation to the image signal processor 500). The YUV domain crop module 876 is configured with one or more crop settings to crop the RAW scaled image 856 to obtain a cropped image 888 with a field of view reduced to a narrowest field of view (e.g., 62 degree HFOV and 1920×1080 pixels). The YUV domain scale module 878 is configured to down-scale the cropped image 888 to obtain a scaled image 890 with the narrowest field of view at the encode resolution (e.g., 62 degrees HFOV and 1920×1080 pixels). The scaled image 860 is passed to the encoder 820 for encoding (e.g., JPEG, MPEG, or VP9 encoding).

For example, the encoder 820 may include the encoder 420 of FIG. 4.

For example, while zooming/changing field of view between 118 degrees HFOV and 85 degrees HFOV, a field of view selection (e.g., a zoom ratio) coming from a user-interface may be converted to a crop setting (e.g., a configuration parameter specifying a crop resolution). A RAW crop block and RAW scaler may be programmed dynamically to implement the field of view adjustment. For example, the field of view adjustment may be implemented dynamically by switching from the first row to the second row of FIG. 8 dynamically and keep using flow of the second row until an 85 degree HFOV is achieved.

For example, while zooming/changing field of view between 85 degrees HFOV and 62 degrees HFOV, a field of view selection (e.g., a zoom ratio) coming from a user-interface may be converted to a crop setting (e.g., a configuration parameter specifying a crop resolution). A YUV crop block and a YUV scaler mat be programmed dynamically to implement the field of view adjustment. For example, the field of view adjustment may be implemented dynamically by switching from the second row to the third row of FIG. 8 dynamically and keep using flow of the third row until a 62 degree HFOV is achieved.

Other configurations (not shown in FIG. 8) of the YUV domain crop module and the YUV domain scale module may be used to dynamically obtain images at additional intermediate fields of view from along the range between the widest available field of view and the narrowest available field of view.

Figure 9:
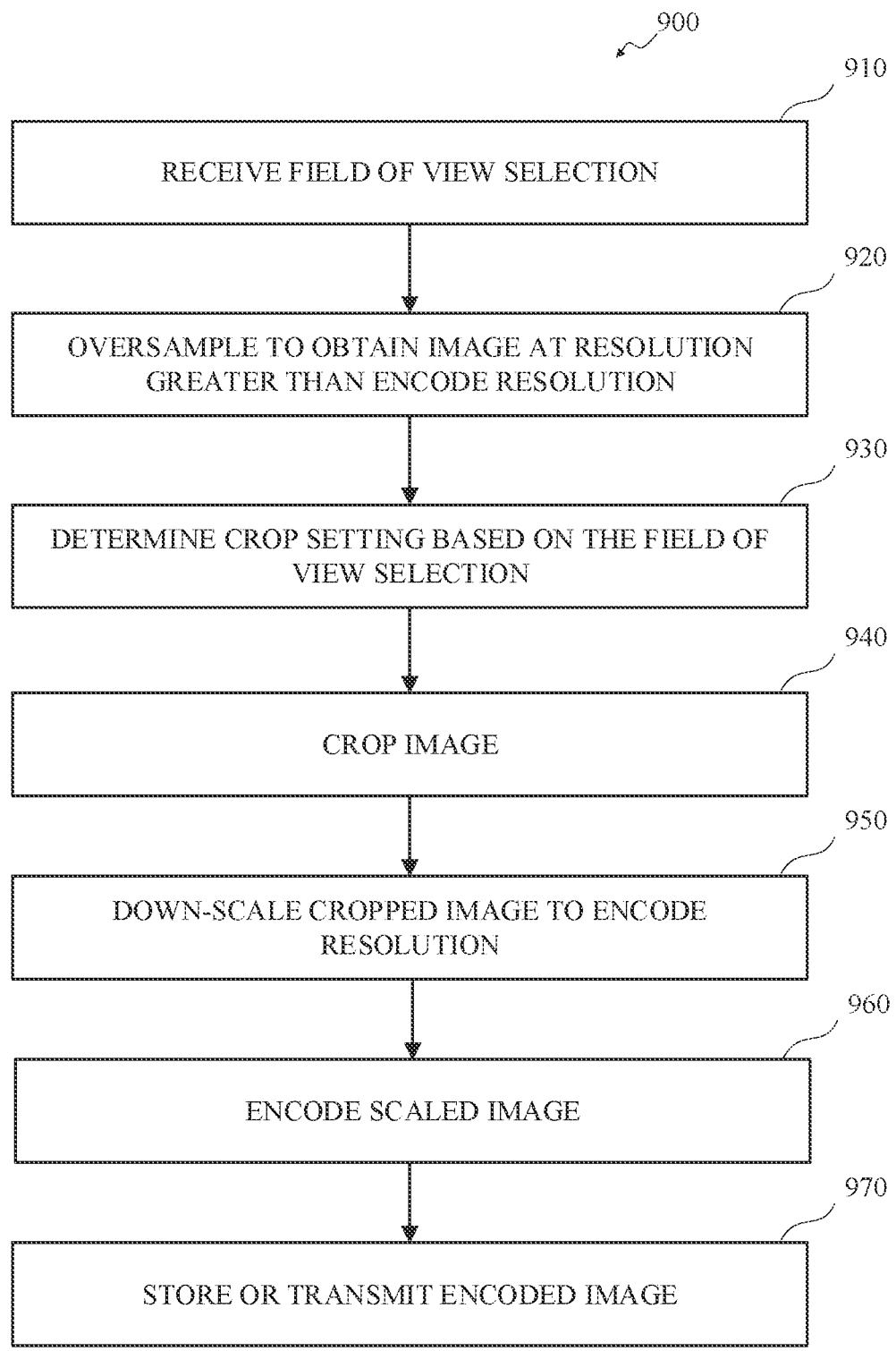
FIG. 9 is a flowchart of an example of a process for adjusting a field of view for an image capture device.

FIG. 9 is a flowchart of an example of a process 900 for adjusting a field of view for an image capture device. The process includes receiving 910 a field of view selection; oversampling 920 to obtain an image at a capture resolution that is greater than an encode resolution; determining 930 a crop setting based on the field of view selection; cropping 940 the image using the crop setting to obtain a cropped image; down-scaling 950 the cropped image to obtain a scaled image at the encode resolution; encoding 960 the scaled image at the encode resolution; and storing, displaying, or transmitting 970 an output image based on the scaled image. For example, the process 900 may be implemented by the system 600 of FIG. 6A or the system 630 of FIG. 6B. For example, the process 900 may be implemented by an image capture device, such the image capture device 610 shown in FIG. 6A, or an image capture apparatus, such as the image capture apparatus 110 shown in FIG. 1 or the image capture apparatus 300 of FIG. 3. For example, the process 900 may be implemented by a personal computing device, such as the personal computing device 660. For example, the process 900 may be implemented using a processing apparatus (e.g., the processing apparatus 612) that includes an image signal processor (e.g., the image signal processor 500). For example, the process 900 may be implemented by the image processing pipeline 700 of FIG. 7. For example, the process 900 may be implemented by the image processing pipeline 800 of FIG. 8.

The process 900 includes receiving 910 receiving a field of view selection. For example, the field of view selection may be received 910 via a user interface (e.g., the user interface unit 212, the user interface 620, or the user interface 664). In some implementations, a slider interface may be presented via a touchscreen display, and the field of view selection is received 910 via the touchscreen display based on a user interaction with the slider interface. In some implementations, the field of view selection may be received 910 via a communications link (e.g., the communications link 650). For example, the field of view selection may be received 910 via a drop down menu presented in a user interface. For example, the field of view selection may be received 910 as text entered in a user interface. For example, the field of view selection may be received 910 via a wireless or wired communications interface (e.g., Wi-Fi, Bluetooth, USB, HDMI, Wireless USB, Near Field Communication (NFC), Ethernet, a radio frequency transceiver, and/or other interfaces). For example, the field of view selection may be received 910 via communications interface 666.

The process 900 includes oversampling 920, using an image sensor, to obtain an image (e.g., a still image or a frame of video) at a capture resolution that is greater than an encode resolution. For example, the capture resolution may be 3840×2160 pixels and the encode resolution may be 1920×1080 pixels, which may enable high quality digital zoom up to 2× without up-scaling. The image sensor may be part of an image capture apparatus (e.g., the image capture apparatus 110, the image capture apparatus 300, the image capture device 610, or the image capture device 640). For example, the image may be received from the image sensor via a bus (e.g., the bus 624 or image signal processor bus 590). For example, the image may be received via a front ISP (e.g., the front ISP 510) that performs some initial processing on the received image. For example, the image may represent each pixel value in a defined format, such as in a RAW image signal format. For example, the image be stored in a format using the Bayer color mosaic pattern.

The process 900 includes determining 930 a crop setting based on the field of view selection. For example, the crop setting may be for a RAW domain crop. For example, the crop setting may be for a YUV domain crop. In some implementations, multiple crop settings are determined that specify a RAW domain crop and YUV domain crop that jointly achieve a field of view specified by the field of view selection. For example, a crop setting may specify a portion of a horizontal field of view that will be cropped out or a portion of a vertical field of view that will be cropped out. For example, a crop setting may explicitly or implicitly specify a crop operation that will maintain the aspect ratio of the image.

The process 900 includes cropping 940 the image using the crop setting to obtain a cropped image. For example, cropping 940 the image using the crop setting may include cropping the image in a RAW domain, before conversion to a YUV domain. For example, cropping 940 the image using the crop setting may include cropping the image in a YUV domain, after conversion from a RAW domain. In some implementations, pixels around the edges of the image are cropped 940 out to retain a portion in the center of the image corresponding to a narrower field of view. The aspect ratio of the image may be preserved by the cropping 940. For example, the process 1000 of FIG. 10 may be implemented to determine 930 the crop setting and crop 940 the image using the crop setting.

The process 900 includes down-scaling 950 the cropped image to obtain a scaled image at the encode resolution (e.g., 1920×1080 pixels). For example, down-scaling 950 the cropped image may include down-scaling the cropped image in a YUV domain, after conversion from a RAW domain. For example, down-scaling 950 the cropped image may include down-scaling the cropped image in a RAW domain, before conversion from a YUV domain. For example, an image signal processor may be used to crop 940 the image using the crop setting to obtain a cropped image, and down-scale 950 the cropped image to obtain a scaled image at the encode resolution.

The process 900 includes encoding 960 the scaled image at the encode resolution (e.g., 1920×1080 pixels) to obtain an encoded image. For example, encoding 960 the scaled image may include performing a JPEG encoding, an MPEG encoding, or a VP9 encoding. For example, the encoder 420 of FIG. 4 may be used to encode 960 the scaled image at the encode resolution.

The process 900 includes storing, displaying, or transmitting 970 an output image based on the scaled image. For example, the output image may be a preview image that is displayed 970 on a display of an image capture device (e.g., a display of the user interface unit 212, a display of the user interface 620, or a display of the user interface 664). For example, the output image may be the encoded image. For example, the process 900 may include storing or transmitting 970 the encoded image. For example, the output image (e.g., the encoded image) may be transmitted 970 to an external device (e.g., a personal computing device) for display or storage. For example, the output image may be transmitted 970 via the communications interface 618. For example, the output image (e.g., the encoded image) may be stored 970 in memory of the processing apparatus 612 or in memory of the processing apparatus 662.

Performing the process 900 on an image capture device may consume more power than a low power preview mode of the device. For example, images from the image sensor may be up-scaled during the low power preview mode, which may enable image processing of the images at lower resolutions to consume less power. It may be advantageous to run in the low power preview mode when the image capture device is not actively being used for image capture. In some implementations, the process 900 may be initiated when a low power preview mode is terminated responsive to the detection of an event indicating active use of the image capture device. For example, a low power preview mode may be terminated responsive to detection of a framing event based on touch data from a touchscreen display (e.g., a touchscreen display of the user interface unit 212, the user interface 620, or the user interface 664). In some implementations, an image capture device may include a gyroscope, and the low power preview mode may be terminated responsive to detection of a framing event based on angular rate data from a gyroscope.

Figure 10:
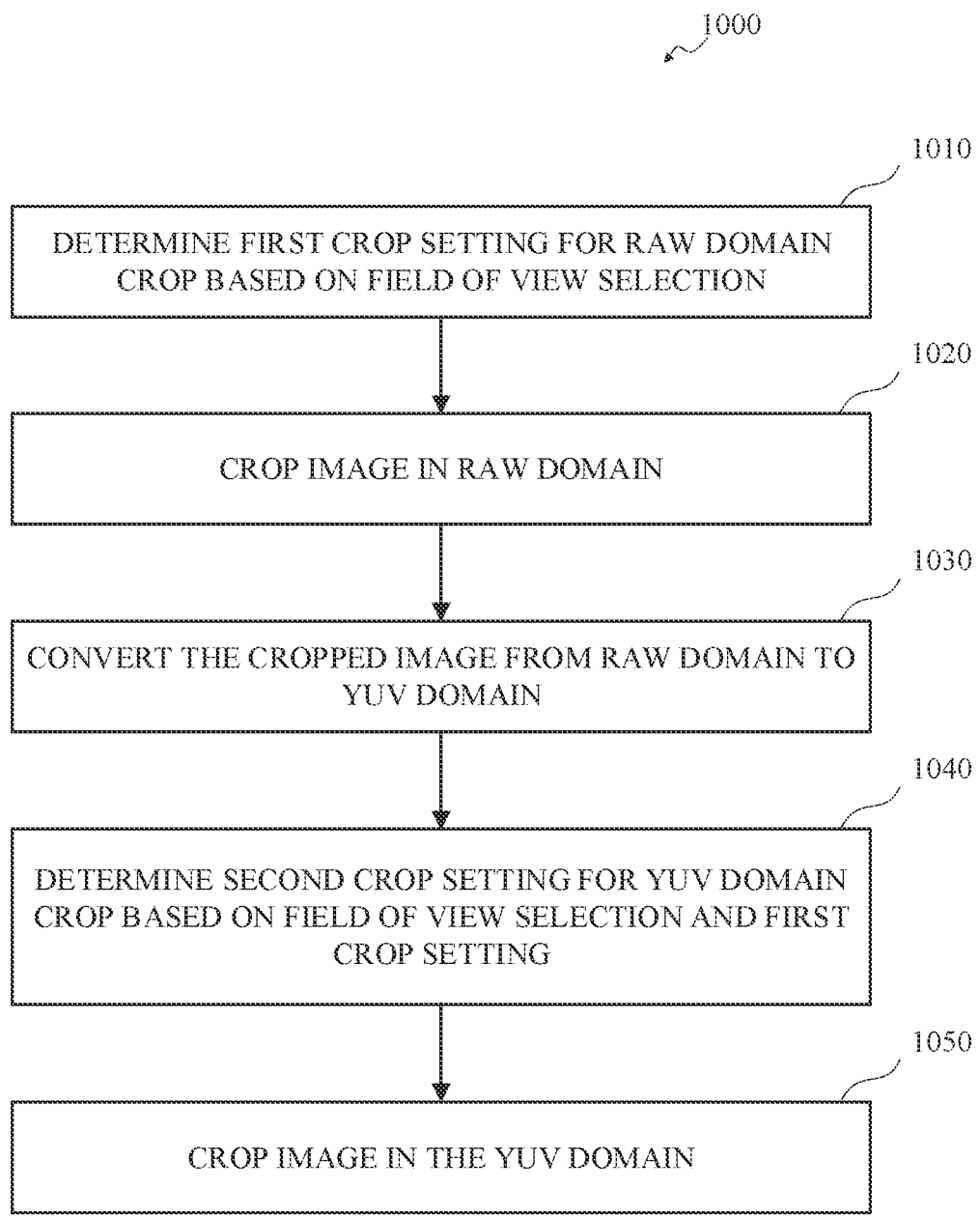
FIG. 10 is a flowchart of an example of a process for determining crop settings based on a field of view selection.

FIG. 10 is a flowchart of an example of a process 1000 for determining crop settings based on a field of view selection. The process 1000 includes determining 1010 a first crop setting for a RAW domain crop based on the field of view selection; cropping 1020 the image in a RAW domain; convert 1030 the cropped image from the RAW domain to a YUV domain; determining 1040 a second crop setting for a YUV domain crop based on the field of view selection and the first crop setting; and cropping 1050 the image in the YUV domain using the second crop setting. For example, the process 1000 may be implemented by the system 600 of FIG. 6A or the system 630 of FIG. 6B. For example, the process 1000 may be implemented by an image capture device, such the image capture device 610 shown in FIG. 6A, or an image capture apparatus, such as the image capture apparatus 110 shown in FIG. 1 or the image capture apparatus 300 of FIG. 3. For example, the process 1000 may be implemented by a personal computing device, such as the personal computing device 660. For example, the process 1000 may be implemented using a processing apparatus (e.g., the processing apparatus 612) that includes an image signal processor (e.g., the image signal processor 500). For example, the process 1000 may be implemented by the image processing pipeline 800 of FIG. 8.

The process 1000 includes determining 1010 a first crop setting for a RAW domain crop based on the field of view selection. For example, the first crop setting may be set to a value that will reduce an image to an intermediate resolution (e.g., 2704×1520 pixels) that is supported by an image processing pipeline (e.g., an image processing pipeline implemented with an image signal processor), where cropping to achieve a field of view specified by the field of view selection would reduce the resolution of the image below the intermediate resolution.

The process 1000 includes cropping 1020 the image in a RAW domain, before conversion to a YUV domain. The image may be cropped 1020 using the first crop setting. In some implementations, pixels around the edges of the image are cropped 1020 out to retain a portion in the center of the image corresponding to a narrower field of view. The aspect ratio of the image may be preserved by the cropping 1020.

The process includes converting 1030 the cropped image from the RAW domain to a YUV domain. For example, a linear transformation (e.g., a matrix multiplication) may be applied to the pixel values of the cropped image to convert 1030 the cropped image from the RAW domain (e.g., an RGB representation) to the YUV domain.

The process 1000 includes determining 1040 a second crop setting for a YUV domain crop based on the field of view selection and the first crop setting. For example, where the image has been cropped 1020 in the RAW domain using the first crop setting to an intermediate resolution (e.g., 2704×1520 pixels) and image processing, including the conversion to the YUV domain and possible additional processing (e.g., noise reduction and/or local tone mapping), is performed on the image data at the intermediate resolution, the second crop setting may be determined 1040 to reduce the field of view of the image further to a field of view specified by the field of view selection.

The process 1000 includes cropping 1050 the image in the YUV domain using the second crop setting, after conversion from the RAW domain. The image may be cropped 1050 using the second crop setting. In some implementations, pixels around the edges of the image are cropped 1050 out to retain a portion in the center of the image corresponding to a narrower field of view that is specified by the field of view selection. The aspect ratio of the image may be preserved by the cropping 1050.

Where certain elements of these implementations may be partially or fully implemented using known components, those portions of such known components that are necessary for an understanding of the present disclosure have been described, and detailed descriptions of other portions of such known components have been omitted so as not to obscure the disclosure.

In the present specification, an implementation showing a singular component should not be considered limiting; rather, the disclosure is intended to encompass other implementations including a plurality of the same component, and vice-versa, unless explicitly stated otherwise herein.

Further, the present disclosure encompasses present and future known equivalents to the components referred to herein by way of illustration.

As used herein, the term "bus" is meant generally to denote any type of interconnection or communication architecture that may be used to communicate data between two or more entities. The "bus" could be optical, wireless, infrared or another type of communication medium. The exact topology of the bus could be, for example, standard "bus," hierarchical bus, network-on-chip, address-event-representation (AER) connection, or other type of communication topology used for accessing, e.g., different memories in a system.

As used herein, the terms "computer," "computing device," and "computerized device" include, but are not limited to, personal computers (PCs) and minicomputers (whether desktop, laptop, or otherwise), mainframe computers, workstations, servers, personal digital assistants (PDAs), handheld computers, embedded computers, programmable logic devices, personal communicators, tablet computers, portable navigation aids, Java 2 Platform, Micro Edition (J2ME) equipped devices, cellular telephones, smart phones, personal integrated communication or entertainment devices, or literally any other device capable of executing a set of instructions.

As used herein, the term "computer program" or "software" is meant to include any sequence of machine cognizable steps which perform a function. Such program may be rendered in virtually any programming language or environment including, for example, C/C++, C#, Fortran, COBOL, MATLAB™, PASCAL, Python, assembly language, markup languages (e.g., HTML, Standard Generalized Markup Language (SGML), XML, Voice Markup Language (VoxML)), as well as object-oriented environments such as the Common Object Request Broker Architecture (CORBA), Java™ (including J2ME, Java Beans), and/or Binary Runtime Environment (e.g., Binary Runtime Environment for Wireless (BREW)).

As used herein, the terms "connection," "link," "transmission channel," "delay line," and "wireless" mean a causal link between any two or more entities (whether physical or logical/virtual) which enables information exchange between the entities.

As used herein, the terms "integrated circuit," "chip," and "IC" are meant to refer to an electronic circuit manufactured by the patterned diffusion of trace elements into the surface of a thin substrate of semiconductor material. By way of non-limiting example, integrated circuits may include field programmable gate arrays (e.g., FPGAs), a programmable logic device (PLD), reconfigurable computer fabrics (RCFs), systems on a chip (SoC), application-specific integrated circuits (ASICs), and/or other types of integrated circuits.

As used herein, the term "memory" includes any type of integrated circuit or other storage device adapted for storing digital data, including, without limitation, read-only memory (ROM), programmable ROM (PROM), electrically erasable PROM (EEPROM), dynamic random access memory (DRAM), Mobile DRAM, synchronous DRAM (SDRAM), Double Data Rate 2 (DDR/2) SDRAM, extended data out (EDO)/fast page mode (FPM), reduced latency DRAM (RLDRAM), static RAM (SRAM), "flash" memory (e.g., NAND/NOR), memristor memory, and pseudo SRAM (PSRAM).

As used herein, the terms "microprocessor" and "digital processor" are meant generally to include digital processing devices. By way of non-limiting example, digital processing devices may include one or more of digital signal processors (DSPs), reduced instruction set computers (RISC), general-purpose complex instruction set computing (CISC) processors, microprocessors, gate arrays (e.g., field programmable gate arrays (FPGAs)), PLDs, reconfigurable computer fabrics (RCFs), array processors, secure microprocessors, application-specific integrated circuits (ASICs), and/or other digital processing devices. Such digital processors may be contained on a single unitary IC die or distributed across multiple components.

As used herein, the term "network interface" refers to any signal, data, and/or software interface with a component, network, and/or process. By way of non-limiting example, a network interface may include one or more of FireWire (e.g., FW400, FW110, and/or other variations), USB (e.g., USB2), Ethernet (e.g., 10/100, 10/100/1000 (Gigabit Ethernet), 10-Gig-E, and/or other Ethernet implementations), MoCA, Coaxsys (e.g., TVnet™), radio frequency tuner (e.g., in-band or out-of-band, cable modem, and/or other radio frequency tuner protocol interfaces), Wi-Fi (802.11), WiMAX (802.16), personal area network (PAN) (e.g., 802.15), cellular (e.g., 3G, LTE/LTE-A/TD-LTE, GSM, and/or other cellular technology), IrDA families, and/or other network interfaces.

As used herein, the term "Wi-Fi" includes one or more of IEEE-Std. 802.11, variants of IEEE-Std. 802.11, standards related to IEEE-Std. 802.11 (e.g., 802.11 a/b/g/n/s/v), and/or other wireless standards.

As used herein, the term "wireless" means any wireless signal, data, communication, and/or other wireless interface. By way of non-limiting example, a wireless interface may include one or more of Wi-Fi, Bluetooth, 3G (3GPP/3GPP2), High Speed Downlink Packet Access/High Speed Uplink Packet Access (HSDPA/HSUPA), Time Division Multiple Access (TDMA), Code Division Multiple Access (CDMA)(e.g., IS-95A, Wideband CDMA (WCDMA), and/or other wireless technology), Frequency Hopping Spread Spectrum (FHSS), Direct Sequence Spread Spectrum (DSSS), Global System for Mobile communications (GSM), PAN/802.15, WiMAX (802.16), 802.20, narrowband/Frequency Division Multiple Access (FDMA), Orthogonal Frequency Division Multiplex (OFDM), Personal Communication Service (PCS)/Digital Cellular System (DCS), LTE/LTE-Advanced (LTE-A)/Time Division LTE (TD-LTE), analog cellular, cellular Digital Packet Data (CDPD), satellite systems, millimeter wave or microwave systems, acoustic, infrared (i.e., IrDA), and/or other wireless interfaces.

As used herein, the terms "camera," or variations thereof, and "image capture device," or variations thereof, may be used to refer to any imaging device or sensor configured to capture, record, and/or convey still and/or video imagery which may be sensitive to visible parts of the electromagnetic spectrum, invisible parts of the electromagnetic spectrum (e.g., infrared, ultraviolet), and/or other energy (e.g., pressure waves).

While certain aspects of the technology are described in terms of a specific sequence of steps of a method, these descriptions are illustrative of the broader methods of the disclosure and may be modified by the particular application. Certain steps may be rendered unnecessary or optional under certain circumstances. Additionally, certain steps or functionality may be added to the disclosed implementations, or the order of performance of two or more steps may be permuted. All such variations are considered to be encompassed within the disclosure.

While the above-detailed description has shown, described, and pointed out novel features of the disclosure as applied to various implementations, it will be understood that various omissions, substitutions, and changes in the form and details of the devices or processes illustrated may be made by those skilled in the art without departing from the disclosure. The foregoing description is in no way meant to be limiting, but rather should be taken as illustrative of the general principles of the technology.

What is claimed is:

1. An image capture device comprising:
   an image sensor configured to capture images;
   a touchscreen display configured to present a user interface including a slider interface;
   a gyroscope; and
   a processing apparatus configured to:
   receive a field of view selection via the slider interface;
   oversample, using the image sensor, to obtain an image at a capture resolution that is greater than an encode resolution;
   determine a crop setting for a RAW domain crop based on the field of view selection;
   crop the image in a RAW domain using the crop setting to obtain a cropped image;
   convert the cropped image from the RAW domain to a YUV domain;
   down-scale the cropped image in the YUV domain to obtain a scaled image at the encode resolution;
   encode the scaled image at the encode resolution to obtain an encoded image;
   store or transmit the encoded image; and
   terminate a low power preview mode responsive to detection of a framing event based on angular rate data from the gyroscope, in which images from the image sensor are up-scaled during the low power preview mode.

2. The image capture device of claim 1, in which the processing apparatus is configured to:
   down-scale the cropped image in the RAW domain to an intermediate resolution, before conversion to the YUV domain.

3. The image capture device of claim 1, in which the processing apparatus is configured to:
   dynamically adjust a field of view of images captured using the image sensor that are passed to the encoder at the encode resolution for encoding.

4. The image capture device of claim 1, in which the processing apparatus comprises an image signal processor that is configured to:
   crop the image using the crop setting to obtain a cropped image; and
   down-scale the cropped image to obtain a scaled image at the encode resolution.

5. The image capture device of claim 1, in which the processing apparatus is configured to:
   cropping the cropped image in the YUV domain, after conversion from the RAW domain.

6. A system comprising:
   an image sensor configured to capture images; and
   a processing apparatus configured to:
   receive a field of view selection;
   oversample, using the image sensor, to obtain an image at a capture resolution that is greater than an encode resolution;
   determine a crop setting based on the field of view selection;
   crop the image using the crop setting to obtain a cropped image, in which the crop setting is a first crop setting for a RAW domain crop, and the processing apparatus is configured to crop the image in a RAW domain, before conversion to a YUV domain;
   determine a second crop setting for a YUV domain crop based on the field of view selection and the first crop setting;
   crop the image in the YUV domain using the second crop setting, after conversion from the RAW domain;
   down-scale the cropped image to obtain a scaled image at the encode resolution;
   encode the scaled image at the encode resolution to obtain an encoded image; and
   store or transmit the encoded image.

7. The system of claim 6, in which the processing apparatus is configured to:

down-scale the image in a RAW domain to an intermediate resolution, before conversion to a YUV domain.

8. The system of claim 6, in which the processing apparatus is configured to:
down-scale the cropped image in a YUV domain, after conversion from a RAW domain.

9. The system of claim 6, comprising a touchscreen display, and in which the processing apparatus is configured to:
terminate a low power preview mode responsive to detection of a framing event based on touch data from the touchscreen display, in which images from the image sensor are up-scaled during the low power preview mode.

10. The system of claim 6, comprising a gyroscope, and in which the processing apparatus is configured to:
terminate a low power preview mode responsive to detection of a framing event based on angular rate data from the gyroscope, in which images from the image sensor are up-scaled during the low power preview mode.

11. The system of claim 6, comprising a touchscreen display, and in which the processing apparatus is configured to:
present a slider interface via the touchscreen display, in which the field of view selection is received via the touchscreen display based on a user interaction with the slider interface.

12. The system of claim 6, in which the processing apparatus comprises an image signal processor that is configured to:
crop the image using the crop setting to obtain a cropped image; and
down-scale the cropped image to obtain a scaled image at the encode resolution.

13. The system of claim 6, in which the processing apparatus is configured to:
dynamically adjust a field of view of images captured using the image sensor that are passed to the encoder at the encode resolution for encoding.

14. A method comprising:
receiving a field of view selection;
oversampling, using an image sensor, to obtain an image at a capture resolution that is greater than an encode resolution;
determining a crop setting based on the field of view selection;
cropping the image using the crop setting to obtain a cropped image, in which the crop setting is a first crop setting for a RAW domain crop, and cropping the image using the crop setting to obtain a cropped image comprises cropping the image in a RAW domain, before conversion to a YUV domain, determining a second crop setting for a YUV domain crop based on the field of view selection and the first crop setting, and cropping the image in the YUV domain using the second crop setting, after conversion from the RAW domain;
down-scaling the cropped image to obtain a scaled image at the encode resolution;
encoding the scaled image at the encode resolution; and
storing, displaying, or transmitting an output image based on the scaled image.

15. The method of claim 14, comprising:
down-scaling the image in a RAW domain to an intermediate resolution, before conversion to a YUV domain.

16. The method of claim 14, in which down-scaling the cropped image to obtain a scaled image at the encode resolution comprises:
down-scaling the cropped image in a YUV domain, after conversion from a RAW domain.

17. The method of claim 14, comprising:
terminating a low power preview mode responsive to detection of a framing event based on touch data from a touchscreen display, in which images from the image sensor are up-scaled during the low power preview mode.

18. The method of claim 14, comprising:
terminating a low power preview mode responsive to detection of a framing event based on angular rate data from a gyroscope, in which images from the image sensor are up-scaled during the low power preview mode.

19. The method of claim 14, comprising:
presenting a slider interface via a touchscreen display, in which the field of view selection is received via the touchscreen display based on a user interaction with the slider interface.

20. The method of claim 14, comprising:
dynamically adjusting a field of view of images captured using the image sensor that are encoded at the encode resolution.

* * * * *